(12) United States Patent
Walker et al.

(10) Patent No.: US 9,148,643 B2
(45) Date of Patent: Sep. 29, 2015

(54) SYSTEMS AND METHODS FOR ENCHANCING MEDIA WITH SUPPLEMENTAL CONTENT

(71) Applicant: Walker Digital, LLC, Stamford, CT (US)

(72) Inventors: Jay S. Walker, Ridgefield, CT (US); Zachary T. Smith, Norwalk, CT (US); Jon E. Ellenthal, Wilton, CT (US); Carson C.K. Fincham, Ridgefield, CT (US)

(73) Assignee: Inventor Holdings, LLC, Stamford, CT (US)

( * ) Notice: Subject to any disclaimer, the term of this patent is extended or adjusted under 35 U.S.C. 154(b) by 52 days.

(21) Appl. No.: 13/962,591

(22) Filed: Aug. 8, 2013

(65) Prior Publication Data
US 2013/0322857 A1    Dec. 5, 2013

Related U.S. Application Data

(63) Continuation of application No. 13/093,819, filed on Apr. 25, 2011, now Pat. No. 8,515,255.

(60) Provisional application No. 61/390,703, filed on Oct. 7, 2010, provisional application No. 61/350,709, filed on Jun. 2, 2010, provisional application No. 61/327,675, filed on Apr. 22, 2010.

(51) Int. Cl.
| | | |
|---|---|---|
| H04N 9/80 | (2006.01) | |
| G11B 27/00 | (2006.01) | |
| H04N 5/93 | (2006.01) | |
| H04N 9/87 | (2006.01) | |
| H04N 21/00 | (2011.01) | |
| H04L 29/08 | (2006.01) | |
| G06F 15/167 | (2006.01) | |
| G06F 15/16 | (2006.01) | |

(52) U.S. Cl.
CPC ............... *H04N 9/87* (2013.01); *H04L 67/06* (2013.01); *H04L 67/26* (2013.01); *H04L 67/30* (2013.01); *H04N 21/00* (2013.01)

(58) Field of Classification Search
USPC ............... 709/246, 213, 216, 227, 228, 229; 386/278, 239, 240, 248, 280, 287
See application file for complete search history.

(56) References Cited

U.S. PATENT DOCUMENTS

| | | | |
|---|---|---|---|
| 6,035,323 | A | 3/2000 | Narayen et al. |
| 6,111,586 | A | 8/2000 | Ikeda et al. |
| 6,167,469 | A | 12/2000 | Safai et al. |
| 6,301,607 | B2 | 10/2001 | Barraclough et al. |
| 6,442,573 | B1 | 8/2002 | Schiller et al. |
| 6,580,870 | B1 * | 6/2003 | Kanazawa et al. ............ 386/240 |
| 7,551,782 | B2 | 6/2009 | Lev |

(Continued)

OTHER PUBLICATIONS

Lump, Nathan; "Geek Chic | iPhone Postcard Apps"; NYTimes.com, Sep. 3, 2009; (http://tmagazine.blogs.nytimes.com/2009/09/03/geek-chic-iphone-postcard-apps/), download date Mar. 1, 2012, 7 pp.

(Continued)

*Primary Examiner* — Daquan Zhao
(74) *Attorney, Agent, or Firm* — Fincham Downs, LLC; Carson C. K. Fincham

(57) ABSTRACT

Systems, apparatus, interfaces, methods, and articles of manufacture for enhancing media with supplemental content are provided.

2 Claims, 11 Drawing Sheets

(56) References Cited

U.S. PATENT DOCUMENTS

| | | | |
|---|---|---|---|
| 8,209,223 B2* | 6/2012 | Fink et al. | 705/14.4 |
| 8,656,282 B2* | 2/2014 | Kulas | 715/723 |
| 8,832,303 B2 | 9/2014 | Vasa | |
| 2012/0077586 A1 | 3/2012 | Pishevar | |

OTHER PUBLICATIONS

Agarwal, Amit; "Send your Facebook Updates to Grandma via Post"; (http://www.labnol.org/internet/send-facebook-updates-via-post/13737/), dowload date Mar. 1, 2012, 3 pp.

Presto | Exciting Offer page, "Welcome! Presto welcomes people interested in Sunnygram with a very special offer"; (http://www.presto.com/sunnygram-special/) download date Mar. 1, 2012, 1 pg.

Ganapati, Priya; "HP Adds Facebook, Pandora to Digital Photo Frame"; Gadget Lab | Wired.com; (http://www.wired.com/gadgetlab/2009/09/hp-dreamscreen/), download date Mar. 1, 2012, 5 pp.

Fairlie, Rik; "Digital Photo Frames Join the Social Scene"; NYTimes.com, Gadgetwise, "Getting Smart About Personal Technology"; Jan. 19, 2010; (http://gadgetwise.blogs.nytimes.com2010/01/19/digital-photo-frames-join-the-social-scene/) download date Mar. 1, 2012, 11 pp.

chumby; learn more—"So, what's chumby anyway?"; (http://www.chumby.com/pages/chumby1_learn_overview) download date Mar. 1, 2012; 3 pp; and chumby; learn more—"photo viewing & sharing"; (http://www.chumby.com/pages/learn_photo) download date Mar. 1, 2012, 6 pp.

fidipidi—Custom Greeting Cards: Real cards. Real fun. Real easy; (http://www.fidipidi.com) download date Mar. 1, 2012; 1 pg. and frequently asked questions (http://www.fidipidi.com/hub/faq.html) download date Mar. 1, 2012, 2 pp.

Notice of Allowance for U.S. Appl. No. 13/093,819 mailed Apr. 15, 2013, 8 pp.

Office Action for U.S. Appl. No. 13/093,819 mailed Dec. 3, 2012, 6 pp.

* cited by examiner

SYSTEMS AND METHODS FOR ENCHANCING MEDIA WITH SUPPLEMENTAL CONTENT

CROSS-REFERENCE TO RELATED APPLICATIONS

This application is a continuation of U.S. patent application Ser. No. 13/093,819, filed Apr. 25, 2011, and titled "SYSTEMS AND METHODS FOR ENCHANCING MEDIA WITH SUPPLEMENTAL CONTENT", which issued as U.S. Pat. No. 8,515,255 on Aug. 20, 2013, and which claims benefit and priority under 35 U.S.C. §119(e) to (i) U.S. Provisional Patent Application No. 61/327,675, filed Apr. 24, 2010, and titled "SYSTEMS AND METHODS FOR FACILITATING USE OF TECHNOLOGY", (ii) U.S. Provisional Patent Application No. 61/350,709, filed Jun. 2, 2010, and titled "SYSTEMS AND METHODS FOR FACILITATING USE OF TECHNOLOGY", and (ii) U.S. Provisional Patent Application No. 61/390,703, filed Oct. 7, 2010, and titled "SYSTEMS AND METHODS FOR FACILITATING USE OF TECHNOLOGY". Each of the above-referenced applications is hereby incorporated by reference herein.

BACKGROUND

Beyond conversation, modern tools and social websites provide new ways to share information and media (e.g., pictures, audio, text-based messages and information, videos, etc.) that people miss out on when they don't take advantage of modern technology. For example, in the past people would take pictures on film and share experiences through physically printed photos. Today, this isn't often the case. To share an experience now, many people simply upload digital photos or videos to online accounts. Modern services like Multimedia Messaging Services (MMS), Social Networks and social media make it easy for people to share many aspects of their lives, however there's one catch—the audience must be online. Unfortunately, many offline people, such as grandparents, would love to see digital pictures, videos, messages and activities shared by the online community, such as their children and grandchildren—but without modern technology, they cannot. Without a digital presence, elderly people, especially elderly family members, are out of the loop.

Moreover, as modern tools become more sophisticated and complicated, and as more conversation moves "online", those people who do not readily adopt or easily use new technology (herein referred to as "low-tech users") are missing out on more and more. Few elderly people are able to keep up with ever evolving technology, and therefore cannot operate the hardware and software required to (adequately) use modern communication methods. And while cell phones and computers make it easier to communicate with others who have and routinely and easily use those devices (herein referred to as "high-tech users"), the elderly are likely to receive fewer phone calls, letters, and face to face visits from family members who embrace modern technology. These are but some of the reasons that there exists a need for a communications bridge between people who desire to communicate (such as by sharing media) using very different methods.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
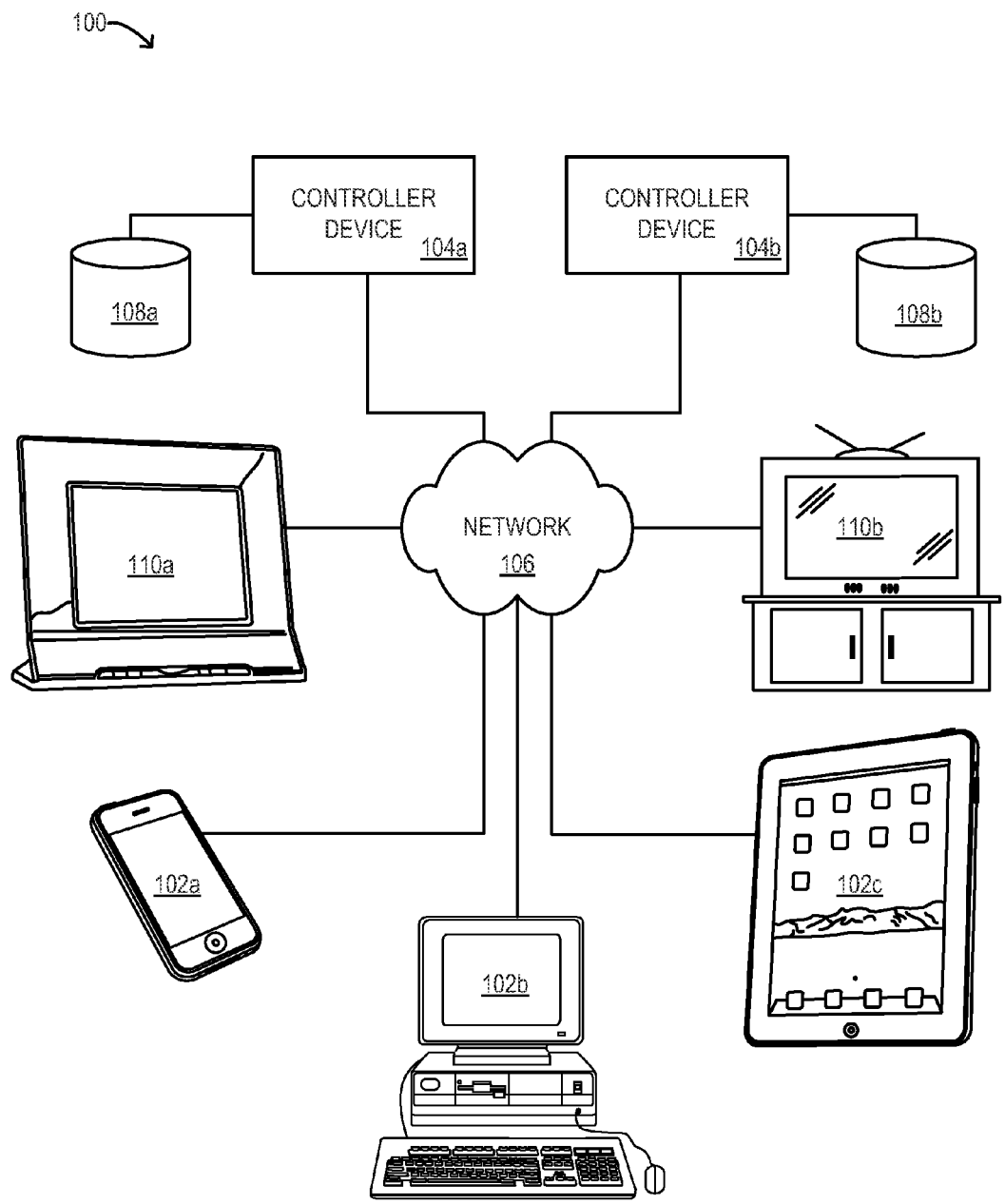
FIG. 1 is a block diagram of a system according to some embodiments.

Embodiments presented herein are descriptive of systems, apparatus, interfaces, methods, and articles of manufacture for enhancing media with supplemental content. In some embodiments, for example, a media enhancement request (e.g., from a high-tech user) may be distributed (e.g., to a low-tech user) to facilitate creation and/or aggregation of related media objects. According to some embodiments, a user (e.g., a low-tech user) may utilize simplistic and/or low-tech methods to enhance a media object. In some embodiments, different portions of a media object may be enhanced with different supplemental media.

In some embodiments, low-tech users may place a call to create media in response to a request from a high-tech user. For instance, a high-tech user may have provided a topic or a list of questions to a service. When the service calls the low-tech user (or when the low-tech user calls the service), the service may present these topics and/or questions to the low-tech user. Similarly, the service may be used by the low-tech user to create media with a specific purpose in mind (e.g., to keep an audio diary, to record life memories). In some embodiments, prompts from software and/or a live interviewer may be employed by the service to help the low-tech member achieve this goal.

In some embodiments, information may be attached or added to media before being distributed. For instance, the service may store profile information about one or more users of the service, such as a picture, a name, an address, a phone number, etc. Similarly, there may be other types of information stored in the users' account or generated by the service, such as information about media (a tag, a caption, a length), a picture uploaded by a user, a relationship between one or more users, etc. Any or all of this information may be attached to the media prior to and/or when it distributed. In some embodiments, if the low-tech user calls and records a story, the audio of the conversation may be stored. In such a case, the service might tag the story with information such as a title, length of the audio, file type (e.g., MP3). In some embodiments, the file may be formatted so that it is attached to one or more other types of media, e.g., a picture.

Following is an example of how a service in accordance with some embodiments may be used: Grandma Jones is 93 and has accumulated quite a few stories over the course of her lifetime. Unfortunately, she doesn't see her family as much as she'd like to, even though she has a desire to stay in closer touch with everyone. She hears about a service called "Family Memories" that can help her make audio recordings of her favorite family memories over the phone, which are then posted on the internet so that her family can enjoy them. After registering, Grandma Jones calls "1-800-Memorie" once a day. On each call, a call center representative interviews her about a different part of her life, edits the interview and then posts Grandma Jones stories on the web. As part of the service, everyone in the family is invited to come listen to the stories on Grandma Jones' webpage on www.FamilyMemories.com. In response to the stories, the family sends pictures of family events to the service, which makes a copy and then forwards the pictures on to Grandma Jones. Now, when Grandma Jones calls to record the family history, she can talk directly to an interviewer who has a picture of the family event that he/she can reference. Once the audio is recorded, a digital copy of the photo is merged with the audio file so both can be played back as a video, slideshow, and//or movie. The whole family is happy to have Grandma Jones' history preserved and Grandma Jones is happy because the family calls her regularly to tell her how much they enjoy the stories.

Following is another example of how a service in accordance with some embodiments may be used: Grandma Jane is given a digital frame that automatically displays pictures submitted by the family. Jerry logs onto an online service, uploads a digital photo and tags it with a "Story Request", which lets Grandma Jane know he would like her to record an audio memory. The service transmits the photo to the frame and when Grandma Jane sees it, she dials "1-800-Stories". She is connected with a live interviewer who can see the picture displayed on the photo frame, and Grandma is interviewed about the subject of the photo. After the interview, the recording of the conversation is edited, attached to the picture, and sent out to Grandma Jane's family.

The preceding examples are provided for introductory purposes and are not intended to be limiting. Various other embodiments, goals, designs, and/or benefits are explained in greater detail and/or should be apparent from the descriptions provided hereinafter.

According to some embodiments, for example, methods may include (1) receiving, by an electronic controller and from a first device of a first user, (i) an indication of a media object, and (ii) an indication of a request for the media object to be enhanced with supplemental content, (2) determining, by the electronic controller, in response to the receiving of the indications from the first device, and based on stored information related to the first user, a second device of a second user, (3) transmitting, by the electronic controller and to the second device of the second user, an indication of the media object and an indication of the request for media object enhancement, (4) receiving, by the electronic controller, and in response to the transmitting to the second device of the device of the indications of the media object and of the request for media object enhancement, an indication of an enhancement to the media object, and/or (5) providing, by the electronic controller and to the first user, the enhanced media object.

In some embodiments, the first device of the first user comprises a mobile electronic device, the second device of the second user comprises one or more of a television and a digital picture frame, and/or the receiving of the indication of the enhancement to the media object comprises receiving a telephone call from the second user. According to some embodiments, the receiving of the indication of the enhancement to the media object comprises receiving a supplemental media object from the second device of the second user, the providing of the enhanced media object to the first user comprises posting the enhanced media on a social networking site in a manner such that it is accessible to the first user, and/or the providing of the enhanced media object to the first user comprises transmitting the enhanced media to the first device of the first user.

According to some embodiments, methods may include (1) receiving, by a processing device, an indication of a first output command received from a user in reference to a first media object being output to the user, the first output command defining a first alteration of the first media object, (2) receiving, by the processing device, an indication of a first supplemental media object associated with the first alteration of the first media object, and/or (3) creating, by the processing device, a second media object comprising two or more of: (i) the first media object, (ii) the first alteration of the first media object, and (iii) the first supplemental media object. In some embodiments, methods may comprise providing, by the processing device and to one or more devices of users having stored associations with the user, the second media object.

According to some embodiments, the media object comprises and image that is being output to the user via a display device and the first output command comprises one or more of a zoom-in command, a zoom-out command, a change in viewing orientation command, a change in portion of the first media object displayed command, an image cutout command, or an image crop command. In some embodiments, the media object comprises audio that is being output to the user via a speaker device and the first output command comprises one or more of a change in volume command, a change in playback speed command, a change in tone or pitch command, or a stop, pause, play, rewind, or fast-forward command. According to some embodiments, the media object comprises video that is being output to the user via a display device and the first output command comprises one or more of a change in speed or frame rate command, or a stop, pause, play, rewind, or fast-forward command. In some embodiments the processing device comprises a CPU of at least one of a television and a digital picture frame. In some embodiments, at least one of (i) the receiving of the indication of the first output command defining the first alteration of the first media object and (ii) the receiving of the indication of the first supplemental media object associated with the first alteration of the first media object, is conducted in response to a media enhancement request received from a different and remote user.

In some embodiments, methods may include (1) providing, by an electronic controller and via a social networking interface, a first media object comprising a plurality of identifiable media portions, (2) receiving, by the electronic controller and via the social networking interface, (i) an indication of a second media object, and (ii) an indication of a first one of the plurality of identifiable media portions of the first media object to which the second media object is desired to be attached, and/or (3) creating, by the electronic controller, a new version of the first media object, the new version having the second media object attached to the first one of the plurality of identifiable media portions of the first media object in a manner such that the second media object is selectable, via the social networking interface, by user interaction with the first one of the plurality of identifiable media portions of the first media object. According to some embodiments, methods may comprise providing, by the electronic controller and via the social networking interface, the new version of the first media object. According to some embodiments, methods may comprise receiving, by the electronic controller and via the social networking interface, (i) an indication of a third media object, and (ii) an indication of a second one of the plurality of identifiable media portions of the first media object to which the third media object is desired to be attached.

In some embodiments, the new version of the first media object is created to also have the third media object attached to the second one of the plurality of identifiable media portions of the first media object in a manner such that the third media object is selectable, via the social networking interface, by user interaction with the second one of the plurality of identifiable media portions of the first media object. In some embodiments, the indication of the second media object is received from a first user and the indication of the third media object is received from a second user that is different than the first user. In some embodiments, the attachment of the second media object to the first one of the plurality of identifiable media portions of the first media object in a manner such that the second media object is selectable, via the social networking interface, by user interaction with the first one of the plurality of identifiable media portions of the first media, comprises (i) associating, by the electronic controller, an icon with the first one of the plurality of identifiable media portions of the first media object, (ii) causing, by the electronic controller, the icon to be displayed upon the first one of the plurality of identifiable media portions of the first media object obtaining focus from a user interaction via the social networking interface, and (iii) causing, by the electronic controller and upon a selection of the displayed icon, the second media object to be output.

Some embodiments may include an apparatus comprising an electronic processor communicatively coupled to a memory device storing specially-programmed instructions that when executed by the electronic processor result in execution of one or more of the methods and/or processes described herein. Some embodiments may include a non-transitory computer-readable medium or memory storing specially-programmed instructions that when executed by an electronic processing device result in execution of one or more of the methods and/or processes described herein. In some embodiments, a system may comprise a network, comprising various communication links via which methods and/or processes of embodiments described herein are facilitated and/or effectuated.

II. Terms and Definitions

Some embodiments described herein are associated with a "media object". As utilized herein, the term "media object" may be utilized to describe any type, quantity, and/or configuration of recorded (and/or otherwise fixed) media. A "media type" may comprise audio, video, images, movies, slideshows, presentations, books, Braille, Morse code, barcodes, tags, markup language, and/or other human-sensible and/or machine-readable information types. Media objects may generally be divided into two (2) categories: physical media and electronic media. As utilized herein, "physical media" may generally refer to any type of media and/or any media object (or portion thereof) that is embodied on (or in) a tangible substrate in a human-sensible state. Examples of physical media objects, which may comprise one or more media types, include, but are not limited to: printed photographs or images, lithographs, paintings, sculptures, architecture, fragrances and/or scents. As utilized herein, "electronic media" may generally refer to any type of media and/or any media object (or portion thereof) that is machine-readable. Examples of electronic media objects, which may comprise one or more media types, include, but are not limited to: digital and/or analog files or recordings, and/or digital representations or recordings of physical media. Unless otherwise noted herein, embodiments that describe receiving, transmitting, posting, broadcasting, and/or otherwise providing a media object are meant to refer to an electronic media object (e.g., which may comprise a digital and/or computer-readable version, copy, representation, and/or indication of a physical media object). In some embodiments, media objects may be distinct from links, pointers, or references to the media objects.

Some embodiments described herein are associated with a "user device" or a "network device". As used herein, a "user device" is a subset of a "network device". The "network device", for example, may generally refer to any device that can communicate via a network, while the "user device" may comprise a network device that is owned or operated by or otherwise associated with a user. Examples of user and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, a tablet computer, or a wireless or cellular telephone. User and/or network devices may comprise one or more network components.

As used herein, the term "network component" may refer to a user and/or network device, or a component, piece, portion, or combination of user and/or network devices. Examples of network components may include, but are not limited to: a Static Random Access Memory (SRAM) device or module, a network processor, a Network Interface Controller (NIC), and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

III. System Overview

Referring first to FIG. 1, a block diagram of a system 100 according to some embodiments is shown. In some embodiments, the system 100 may comprise one or more first-user (or "high-tech") devices 102a-c in communication with one or more controller devices 104a-b (e.g., via a network 106). According to some embodiments, the one or more controller devices 104a-b may be in communication with one or more databases 108a-b, respectively. In some embodiments, the system 100 may comprise one or more second-user (or "low-tech") devices 110a-b. As depicted in FIG. 1, any or all of the devices 102a-c, 104a-b, 110a-b (or any combinations thereof) may be in communication via the network 106.

The first-user devices 102a-c, in some embodiments, may comprise any types or configurations of mobile electronic network, user, and/or communication devices that are or become known or practicable. The first-user devices 102a-c may, for example, comprise cellular and/or wireless telephones such as an iPhone® manufactured by Apple®, Inc. of Cupertino, Calif. or Optimus™ S smart phones manufactured by LG® Electronics, Inc. of San Diego, Calif., and running the Android® operating system from Google®, Inc. of Mountain View, Calif. The first first-user device 102a may, as depicted for example, comprise an iPhone®, the second first-user device 102b may comprise a PC, and/or the third first-user device 102c may comprise a tablet computer such as an iPad® (also available from Apple®, Inc.). In some embodiments, the first-user devices 102a-c may comprise devices owned and/or operated by one or more "first users" or "high-tech users" (not explicitly shown). First or high-tech users may generally comprise users of high-tech devices such as the first-user devices 102a-c (e.g., devices comprising diverse and/or cutting-edge technological capabilities). While different high-tech users will certainly have and/or utilize different skill sets with respect to their respective first-user devices 102a-c, it is assumed for purposes of some embodiments, that all first users will have at least a basic understanding and capability level with respect to the various high-tech features of the first-user devices 102a-c.

According to some embodiments, the first-user devices 102a-c may communicate with one or more of the controller devices 104a-b via the network 106, such as to distribute media objects and/or media enhancement requests as described herein. In some embodiments, the first-user devices 102a-c may interface with the controller devices 104a-b to effectuate communications (direct or indirect) with one or more other first-user devices 102a-c (such communication not explicitly shown in FIG. 1), such as may be operated by other first users. In some embodiments, the first-user devices 102a-c may interface with the controller devices 104a-b to effectuate communications (direct or indirect) with one or more of the second-user devices 110a-b (such communication also not explicitly shown in FIG. 1).

In some embodiments, the controller devices 104a-b may comprise electronic and/or computerized controller device such as computer servers communicatively coupled to interface with the first-user devices 102a-c and/or the second-user devices 110a-b (directly and/or indirectly). The controller devices 104a-b may, for example, comprise PowerEdge™ M910 blade servers manufactured by Dell®, Inc. of Round Rock, Tex. which may include one or more Eight-Core Intel® Xeon® 7500 Series electronic processing devices. According to some embodiments, the controller devices 104a-b may be located remote from the first-user devices 102a-c and/or the second-user devices 110a-b. The controller devices 104a-b may also or alternatively comprise a plurality of electronic processing devices located at one or more various sites and/or locations.

According to some embodiments, the controller devices 104a-b may store and/or execute specially programmed instructions to operate in accordance with embodiments described herein. The controller devices 104a-b may, for example, execute one or more programs that facilitate the enhancement of media and/or the sharing of media and/or media enhancements via the network 106 (e.g., and/or amongst the first-user devices 102a-c and/or the second-user devices 110a-b).

The network 106 may, according to some embodiments, comprise a LAN (wireless and/or wired), cellular telephone, Bluetooth®, and/or RF network with communication links between the controller devices 104a-b, the first-user devices 102a-c, and/or the second-user devices 110a-b. In some embodiments, the network 106 may comprise direct communications links between any or all of the components 102a-c, 104a-b, 108a-b, 110a-b of the system 100. The first-user devices 102a-c may, for example, be directly interfaced or connected to one or more of the second-user devices 110a-b via one or more wires, cables, wireless links, and/or other network components, such network components (e.g., communication links) comprising portions of the network 106. In some embodiments, the network 106 may comprise one or many other links or network components other than those depicted in FIG. 1. The second-user devices 110a-b may, for example, be connected to the controller devices 104a-b via various cell towers, routers, repeaters, ports, switches, and/or other network components that comprise the Internet and/or a cellular telephone (and/or Public Switched Telephone Network (PSTN)) network, and which comprise portions of the network 106.

While the network 106 is depicted in FIG. 1 as a single object, the network 106 may comprise any number, type, and/or configuration of networks that is or becomes known or practicable. According to some embodiments, the network 106 may comprise a conglomeration of different sub-networks and/or network components interconnected, directly or indirectly, by the components 102a-c, 104a-b, 108a-b, 110a-b of the system 100. The network 106 may comprise one or more cellular telephone networks with communication links between the first-user devices 102a-c and the controller devices 104a-b, for example, and/or may comprise the Internet, with communication links between the first controller device 104a and the second controller device 104b, for example.

The databases 108a-b, in some embodiments, may comprise any types or configurations of data storage devices that are or become known or practicable. The databases 108a-b may, for example, comprise data storage devices in communication with the controller devices 104a-b (e.g., respectively), as depicted in FIG. 1. According to some embodiments, the databases 108a-b may store various indications of media objects, user information, account information, and/or Social Networking information. The first database 108a may comprise an online or "cloud" storage database such as in association with the Amazon® Simple Storage Service ("Amazon S3") available from Amazon.com, Inc. of Seattle, Wash., for example, that stores a user's electronic files of various sorts (e.g., media objects). The first controller device 104a may, for example, comprise an Amazon S3 server that provides and/or manages access to content stored in the first database 108a. In some embodiments, the second database 108b may comprise a data storage device of a Social Networking site such as Facebook®, for example, that stores user postings such as text, images, and/or video (e.g., media objects). The second controller device 104b may, for example, comprise a server device operated in conjunction with the Facebook® Social Networking internet site. In some embodiments, the databases 108a-b may store media objects such as digital pictures, characters stored in conformance with the American Standard Code for Information Exchange 2 ("ASCII"), video, markup language, etc.

The second-user devices 110a-c, in some embodiments, may comprise any types or configurations of electronic, network, user, and/or communication devices that are or become known or practicable. According to some embodiments, the second-user devices 110a-c may comprise "low-tech" or simple devices having limited functionality (e.g., by design or by nature of being out-dated). The second-user devices 110a-c may, for example, comprise televisions, simple display devices, alarm clocks, and/or digital picture frames such as the Kodak® Pulse™ picture frame available from the Eastman Kodak Company of Rochester, N.Y. or the CEIVAPro80™ available from CEIVA Logic, Inc. of Burbank, Calif. As depicted in FIG. 1, for example, the first second-user device 110a may comprise a digital picture frame and/or the second second-user device 110b may comprise a television. In some embodiments, the second-user devices 110a-c may comprise devices owned and/or operated by "second users" or "low-tech" users not explicitly shown). Second or low-tech users may generally comprise individuals with low technological understanding or capability (e.g., as compared to the first or high-tech users described herein).

IV. Media Enhancement Request Methods and Processes

Figure 2:
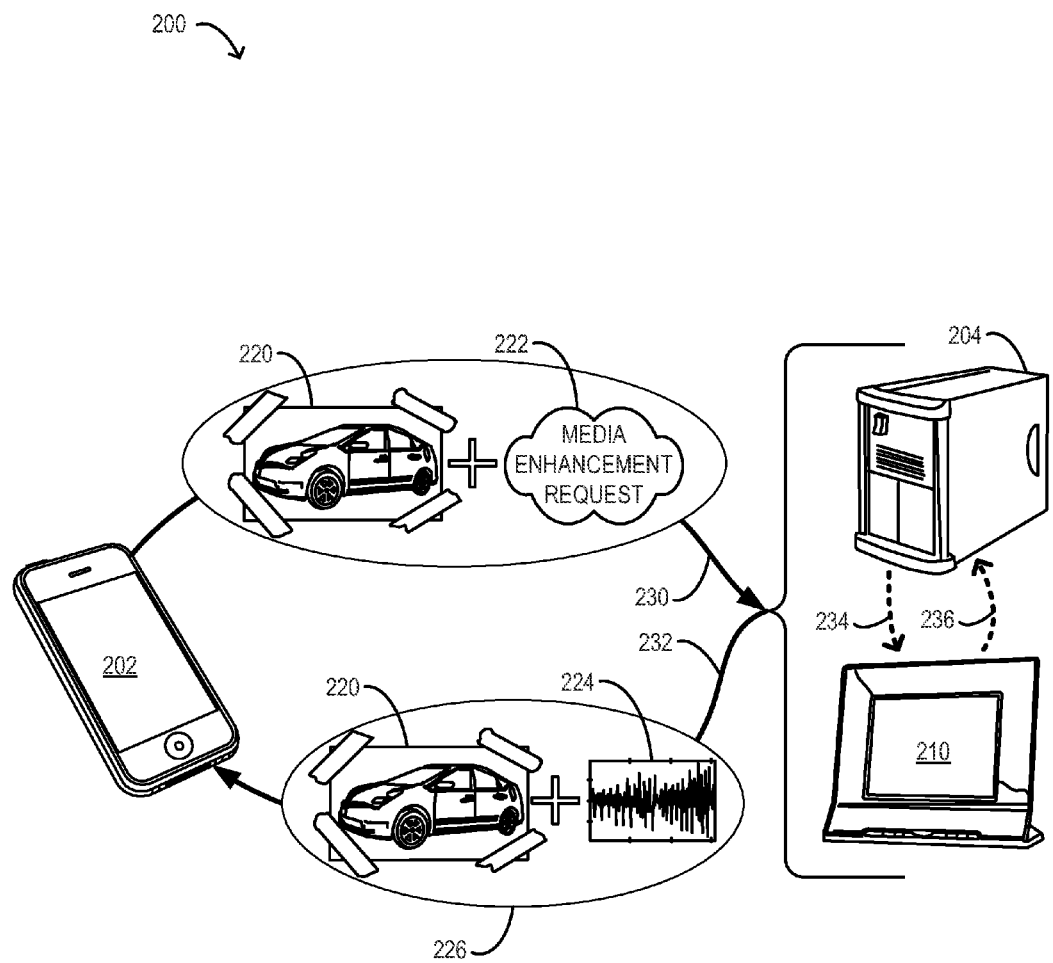
FIG. 2 is a block diagram of a process according to some embodiments.

Turning now to FIG. 2, a block diagram of a process 200 according to some embodiments are shown. The process and flow diagrams described herein do not necessarily imply a fixed order to any depicted actions, steps, and/or procedures, and embodiments may generally be performed in any order that is practicable unless otherwise and specifically noted. Any of the processes and methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

In some embodiments, the process 200 may be performed and/or implemented by and/or otherwise associated with one or more specialized computerized processing devices (e.g., the first-user devices 102a-c, the controller devices 104a-b, and/or the second-user devices 110a-b, of FIG. 1 herein), specialized computers, computer terminals, computer servers, computer systems and/or networks (e.g., the network 106 of FIG. 1), and/or any combinations thereof. As shown in FIG. 2, for example, process 200 may be facilitated by a first-user device 202 (e.g., a cellular telephone or "smart phone", as depicted), a controller device 204 (e.g., a server device, as depicted), and/or a second-user device 210 (e.g., a digital picture frame, as depicted). According to some embodiments, the process 200 may be associated with a media object 220 (e.g., a picture or image, as depicted), a media enhancement request 222, a supplemental media object 224 (e.g., an audio recording or file, as depicted in graphical form), and/or a new media object 226 (e.g., a new version of either or both of the media object 220 and the supplemental media object 224). In some embodiments, the process 200 may also or alternatively be embodied in, facilitated by, and/or otherwise associated with various input mechanisms and/or interfaces as described herein.

According to some embodiments, the process 200 may comprise a first transmission 230 sent from the first-user device 202 (and/or by a first user operating the first-user device 202; not explicitly shown) and received by the controller device 204 and/or the second-user device 210. In some embodiments, the first transmission 230 may comprise the media object 220 and/or the media enhancement request 222. As depicted in FIG. 2, for example, the first user may have (or have access to) the media object 220, such as a digital (or physical) picture of a car. In some embodiments, such as in the case that the media object 220 is already stored or available at or via the controller device 204 (e.g., stored or posted online), the first transmission 230 may include an indication of or reference to the media object 220, as opposed to comprising an actual transmission of the media object 220. According to some embodiments, the first user may desire to have additional media attached and/or referenced with respect to the media object 220 (and/or may desire to have the media object 220 edited). The first user may, for example, be interested in acquiring information about the car in the picture. The media enhancement request 222 may, in some embodiments, provide an indication of the type of enhancement that the first user desires for the media object 220 and/or an audience from which the first user desires or requests the enhancement (e.g., a group of friends, a group of enthusiasts or experts, or a demographic group). As depicted in FIG. 2, for example, the media enhancement request 222 may specify that the first user desires the first user's uncle to enhance the media object 220 by providing details regarding how the uncle came to own the car in the picture. According to some embodiments, the media enhancement request 222 may also or alternatively be sent or provided by a service (e.g., a centralized or remote media enhancement service and/or other web-based service such as a Social Networking service), may be provided separately from the media object 220, and/or may be provided in physical form (e.g., mailed via physical postal carrier to a second user).

In some embodiments, the process 200 may comprise a response transmission 232 sent from the controller device 204 and/or the second-user device 210 (and/or by a second user operating the second-user device 210; not explicitly shown) and received by the first-user device 202. In some embodiments the response transmission 232 may comprise the media object 220 and the supplemental media object 224. According to some embodiments, the combination, aggregation, attachment, and/or other association of the media object 220 and the supplemental media object 224 may comprise and/or define the new media object 226. The new media object 226 may, for example, comprise a new version of the media object 220, enhanced with the supplemental media object 224. In some embodiments, one or more second users may provide the supplemental media object 224 (e.g., via the response transmission 232) and/or may create or define the new media object 226. The providing of the supplemental media object 224 and/or the providing and/or creating of the new media object 226 may, according to some embodiments, be conducted in response to the first transmission 230 (and/or in response to the media enhancement request 222). In some embodiments, the desired or requested audience (e.g., the first user's uncle) may respond to the media enhancement request 222 via the response transmission 232. In the example of FIG. 2, the uncle may, for example, provide an audio description of how he came to own the car in the picture, as requested.

In some embodiments, the process 200 may be conducted by the controller device 204 acting as a server, proxy, and/or "middle man" between the first-user device 202 and the second-user device 210. The first transmission 230 may, for example, be received by the controller device 204 and the media object 220 and/or the media enhancement request 222 may be provided and/or forwarded to the second-user device 210, via a forwarding transmission 234 (or a forwarding action or event, in the case that the information is provided but not transmitted). According to some embodiments, the second user (e.g., the uncle) may receive the forwarding transmission 234 (and/or may access the provided information via or due to the forwarding transmission 234). The uncle in the example of FIG. 2, for example, may view the received picture of the car (i.e., the media object 220) via the digital picture frame (i.e., the second-user device 210) and may be made aware of the media enhancement request 222 (e.g., via the second-user device 210 and/or via one or more other devices and/or methods). In response to the media object 220 and/or the media enhancement request 222, the second user (e.g., the uncle) may provide the supplemental media object 224, such as via a return transmission 236. In some embodiments, the controller device 204 may receive the return transmission 236 and may forward or provide information via the response transmission 232. In some embodiments, the controller device 204 may not be required, active, or controlling in the process 200. The first transmission 230 may be received directly from the first-user device 202, for example, and/or the response transmission 232 may be sent by the second-user device 210.

According to some embodiments, fewer or more components 202, 204, 210, 220, 222, 224, 226 and/or various configurations of the depicted components 202, 204, 210, 220, 222, 224, 226 may be included in execution of the process 200 without deviating from the scope of embodiments described herein. In some embodiments, the components 202, 204, 210 may be similar in configuration and/or functionality to similarly named and/or numbered components as described with reference to the system 100 of FIG. 1 herein.

Figure 3:
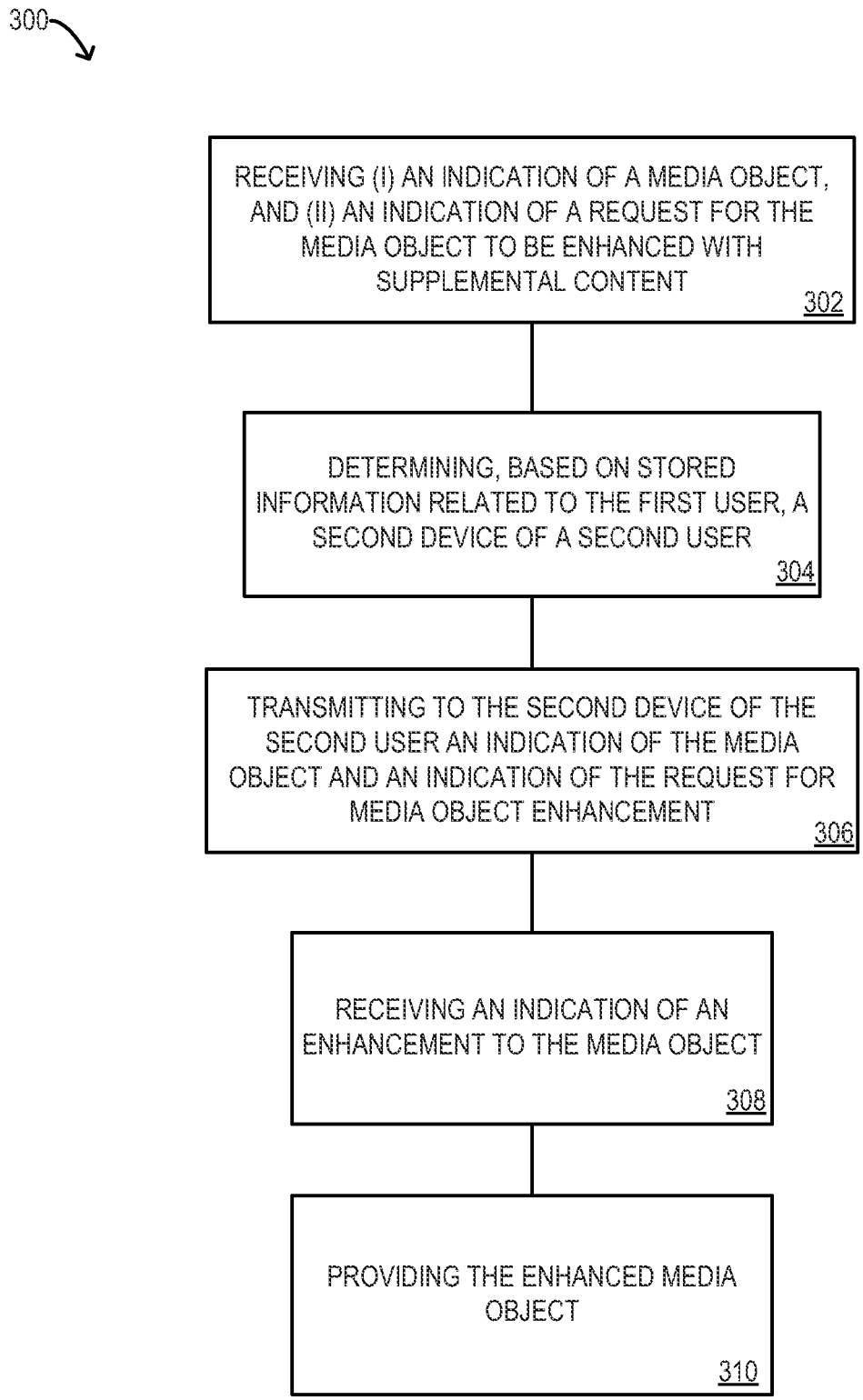
FIG. 3 is a flow diagram of a method according to some embodiments.

Referring now to FIG. 3, a flow diagram of a method 300 according to some embodiments is shown. In some embodiments, the method 300 may be performed and/or implemented by and/or otherwise associated with one or more specialized computerized processing devices (e.g., the first-user devices 102a-c, 202, the controller devices 104a-b, 204, and/or the second-user devices 110a-b, 210 of FIG. 1 and/or FIG. 2 herein), specialized computers, computer terminals, computer servers, computer systems and/or networks (e.g., the network 106 of FIG. 1), and/or any combinations thereof. In some embodiments, the method 300 may be embodied in, facilitated by, and/or otherwise associated with various input mechanisms and/or interfaces described herein. According to some embodiments, the method 300 may be similar in functionality to and/or comprise (in whole or in part) the process 200 of FIG. 2 herein.

In some embodiments, the method 300 may comprise receiving (e.g., by an electronic controller and/or from a first device of a first user) (i) an indication of a media object, and/or (ii) an indication of a request for the media object to be enhanced with supplemental content, at 302. A first device (e.g., the first-user device 102a-c, 202 of FIG. 1 and/or FIG. 2) may be utilized, for example, to send and/or otherwise indicate or identify a media object desired for enhancement, and such information may be received, such as by a central server and/or a second device (e.g., the second-user device 110a-b, 210 of FIG. 1 and/or FIG. 2). In some embodiments, the first device may also or alternatively provide and/or indicate details of a media enhancement request. The media enhancement request may, for example, specify how the indicated media object is desired to be enhanced (e.g., in what manner and/or with what types, quantities, or styles of supplemental media objects) and/or who is desired to conduct and/or initiate the enhancement (e.g., a relative, a group, a team, or an open-ended criteria—such as a request for information from anyone who may have it to share).

According to some embodiments, the method 300 may comprise determining (e.g., by the electronic controller and/or in response to the receiving of the indications from the first device), based on stored information related to the first user, a second device of a second user, at 304. The second user may be a Social Networking "friend" of the first user, for example, on the same team, a member of the same class, and/or otherwise related via one or more stored indications. In some embodiments, the receiving of the indications at 302 may trigger an identification of any related or associated users for whom the media object and/or request may be appropriate to provide. In some embodiments, such as in the case that the second device comprises a communication-enabled digital picture frame or similar device, the first user may be registered to have permission to send media objects to the second device. In some embodiments, the stored information may comprise location information that may, for example, be utilized to determine second devices in various proximities or relations to the first user (and/or the first device). According to some embodiments, such as in the case that the information received at 302 is posted online (e.g., to a Social Networking site) or is received directly by one or more second devices, the determining at 304 may not be included in the method 300.

In some embodiments, the method 300 may comprise transmitting (e.g., by the electronic controller) to the second device of the second user an indication of the media object and an indication of the request for media object enhancement, at 306. According to some embodiments, the indication of the media object and/or the indication of the request for media object enhancement may be provided to the second user and/or to the second device. The indication of the media object and/or the indication of the request for media object enhancement may, for example, be transmitted to and/or otherwise caused to be output by the second device, and/or the indication of the media object and/or the indication of the request for media object enhancement may be made available to the second user and/or second device (such as by providing a link to a website, providing an access code, etc.). In some embodiments, such as in the case that the second device is in direct communication with the first device, the transmitting may be performed by the first device. According to some embodiments, a controller device may manage and/or facilitate communications between the first and second users (and/or their respective devices), and the transmitting may accordingly be performed by the controller device (and/or via or one or more devices associated therewith).

According to some embodiments, the method 300 may comprise receiving (e.g., by the electronic controller and/or in response to the transmitting to the second device of the device of the indications of the media object and of the request for media object enhancement) an indication of an enhancement to the media object, at 308. The second user may receive and/or access the media object and/or the enhancement request, for example, and may provide a supplemental media object and/or indicate one or more edits to the media object, in response to the receiving and/or accessing. In some embodiments, the second user may provide instructions regarding the supplemental media object and/or how the media object should be edited, altered, and/or otherwise enhanced. The indication of the enhancement may comprise, for example, an indication of which supplemental media object should be associated with (e.g., appended and/or attached to) the media object, where and/or how the supplemental media object should be attached, embedded, and/or otherwise associated, and/or when the supplemental media object should be attached, and/or an indication of how the media object should be edited, and/or an indication defining various attributes and/or behavioral characteristics of the enhanced media object and/or any supplemental media objects attached thereto. The second user may indicate, for example, that a video file provided by the second user (e.g., a supplemental media object) should be attached to a digital photo provided by the first user (e.g., the media object), that the attachment should occur on the first day of May, that upon attachment and in the case that someone interacts with the digital photo in a certain manner (e.g., clicks on, hovers over, loads, invokes, comments on, etc.) the video should be automatically played, that the attached video should only be available via the media object for certain users, at certain times, and/or under certain circumstances, and/or that the digital photo should be cropped, the zoom should be altered to focus on a particular aspect of the photo, and/or that other characteristics of the photo should be altered (e.g., at certain times, when viewed by certain users, upon occurrence of certain conditions, at certain times of day, etc.).

In some embodiments, the method 300 may comprise providing (e.g., by the electronic controller and/or to the first user) the enhanced media object, at 310. The enhancement requested by the first user may, for example, be provided in response to the request (and upon the second user providing the enhancement). According to some embodiments, the media object itself and as enhanced may be provided. The second device, a controller device, and/or the first device may, for example, execute a program that creates the enhanced (e.g., new) media object by combining, aggregating, overlaying, embedding, attaching, and/or otherwise associating the media object with the provided supplemental media object. In some embodiments, such as in the case that the first user desires multiple users to comment on and/or append or edit the media object, the enhanced media object may be created to comprise a combination of all enhancements received from all media enhancement request respondents. In some embodiments, such as in the case that the media object and/or the enhanced media object are desired for posting on a Social Networking and/or cloud storage site (e.g., for collaboration and/or dissemination), the providing may comprise posting the enhanced media object on such a site (or sites).

According to some embodiments (and as described herein), the first device of the first user (e.g., the first-user device 102*a-c*, 202 of FIG. 1 and/or FIG. 2) may comprises a mobile electronic device such as a smart phone and/or the second device of the second user (e.g., the second-user device 110*a-b*, 210 of FIG. 1 and/or FIG. 2) may comprises one or more of a television and a digital picture frame. In such a manner, for example, a first (e.g., high-tech) user may provide a media object and a request to enhance the media object to a second (e.g., low-tech) user. In some embodiments, the receiving of the indication of the enhancement to the media object may comprise receiving a telephone call from the second user. The second user, being a low-tech user for example, may place a phone call to record audio to be provided as supplemental content for the media object and/or may provide instructions (e.g., to an operator and/or IVRU) descriptive of other desired modifications and/or enhancements to the media object (e.g., editing commands, descriptions of supplemental media that should be attached to the media object and/or how they should be attached—such as in association with which portion(s) of the media object).

V. Media Enhancement Apparatus

Figure 4:
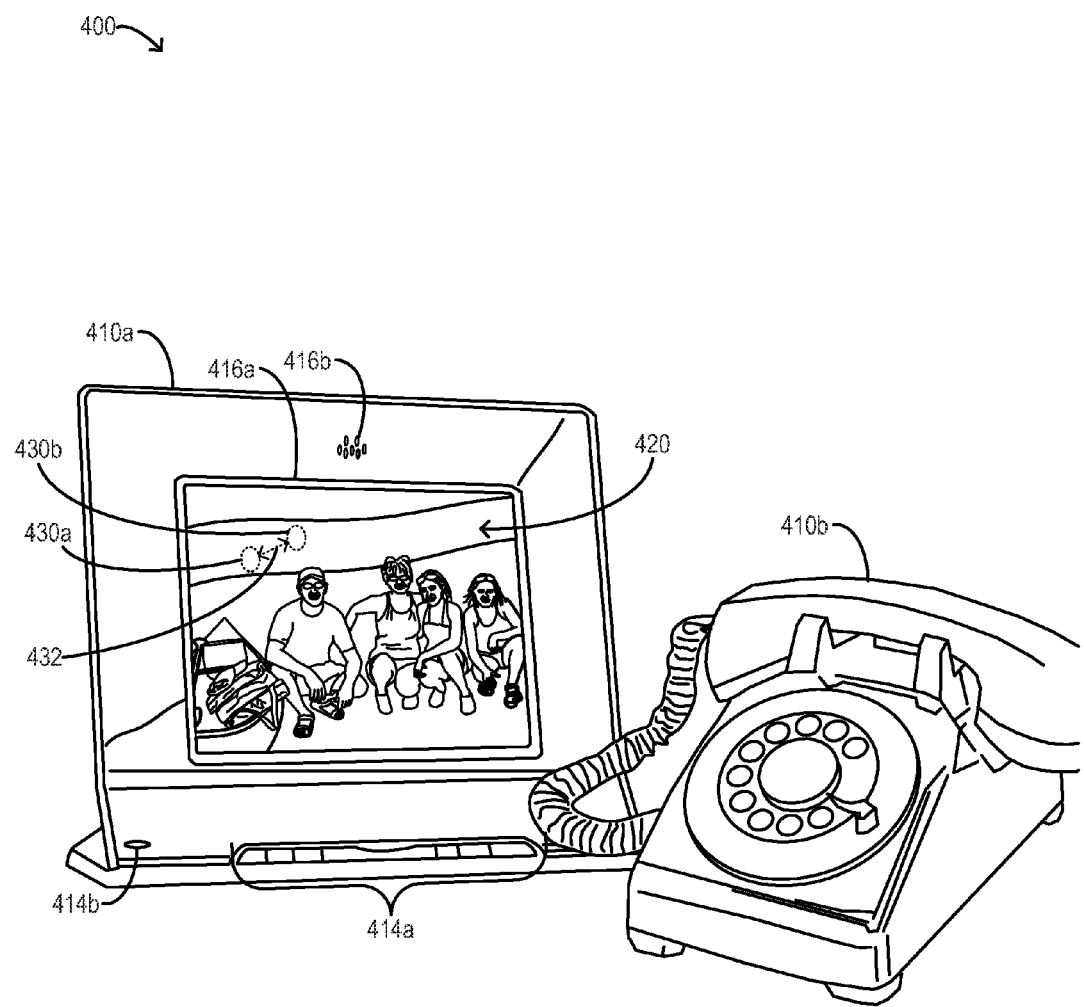
FIG. 4 is a perspective diagram of a system according to some embodiments.

Turning to FIG. 4, a perspective diagram of a system 400 according to some embodiments is shown. In some embodiments, the system 400 may comprise a first media enhancement device 410*a* (e.g., a digital picture frame, as depicted) and/or a second media enhancement device 410*b* (e.g., a telephone, as depicted). According to some embodiments, the media enhancement devices 410*a-b* may be similar in configuration and/or functionality to the second-user devices 110*a-b*, 210 as described in reference to FIG. 1 and/or FIG. 2 herein. The media enhancement devices 410*a-b* may, for example, execute, process, facilitate, and/or otherwise be associated with the process 200 and/or the method 300 of FIG. 2 and/or FIG. 3 herein. In some embodiments, the first media enhancement device 410*a* may comprise one or more input devices 414*a-b* and/or one or more output devices 416*a-b*. Fewer or more components 410*a-b*, 414*a-b*, 416*a-b* and/or various configurations of the components 410*a-b*, 414*a-b*, 416*a-b* may be included in the system 400 without deviating from the scope of embodiments described herein.

According to some embodiments, the first media enhancement device 410*a* may comprise a first input device 414*a*, such as the buttons depicted in FIG. 4, and/or may comprise a second input device 414*b*, such as the microphone depicted in FIG. 4. In some embodiments, the first media enhancement device 410*a* may comprise a first output device 416*a*, such as the display device depicted in FIG. 4, and/or may comprise a second output device 416*b*, such as the speaker depicted in FIG. 4. Various circuitry, processing devices, memory devices, communication devices, and/or other electronics and/or mechanics may be housed within the first media enhancement device 410*a* and/or may be in communication with any or all of the components 414*a-b*, 416*a-b* described in reference to the perspective view of the first media enhancement device 410*a* shown in FIG. 4.

In some embodiments, the first output device 416*a* may output a media object 420. The media object 420, such as the digital picture depicted in FIG. 4 may, for example, be output to a second and/or low-tech user. The media object 420 may, for example, be similar to the media object 220 of the process 200 of FIG. 2. According to some embodiments, the first media enhancement device 410*a* may be utilized to provide and/or define an enhancement to the media object 420. In some embodiments, the second user may provide an editing enhancement such as cropping the media object 420 (e.g., in the case that the media object 420 is an image or a photo, as depicted). The second user may, for example, select a first location 430*a* on the media object 420, select a second location 430*b* on the media object, and/or provide a zoom or crop command 432. In the case that the first output device 416*a* comprises a touch-screen interface (e.g., and accordingly also functions as an input device), for example, the second user may select the first location 430*a* with a first finger or digit (not shown), select the second location 430*b* with a second finger or digit (also not shown), and increase or decrease the separation of the fingers or digits, thereby defining the zoom or crop command 432 (e.g., increasing the separation may cause a zoom-in and/or crop command and/or decreasing the separation may cause a zoom-out and/or "add border" command).

In some embodiments, zoom, crop, and/or other editing commands appropriate and/or applicable to the type(s) of media that the media object 420 comprises may be provided via the first media enhancement device 410*a*. The first input device(s) 414*a* may, for example, be utilized to interface with a menu (not explicitly shown) provided via the first output device 416*a* (e.g., visually) and/or the second output device 416*b* (e.g., audibly) and/or to provide direct commands and/or indications with respect to desired enhancements. In some embodiments, such as in the case that the first media enhancement device 410*a* comprises voice-command capabilities, the second input device 414*b* may utilized to indicate and/or provide desired enhancements (e.g., the second user may simply state "zoom in", "crop", "send", etc.).

According to some embodiments, supplemental media objects (not explicitly shown in FIG. 4) may be provided and/or attached to, embedded in, and/or otherwise associated with the media object 420 via the first media enhancement device 410*a*. The input devices 414*a-b* may be utilized to interface with a menu and/or command system of the first media enhancement device 410*a*, for example, to indicate one or more supplemental media objects that should become associated with the media object 420 (and/or portions thereof). In some embodiments, a menu of stored media files (not shown; e.g., stored on the first media enhancement device 410*a* and/or stored on one or more devices accessible to the first media enhancement device 410*a*) may be accessed and one or more of such files selected for association with the media object 420.

In some embodiments, supplemental media objects may be created via the first media enhancement device 410*a* and/or via the second media enhancement device 410*b*. The second input device 414*b* may be utilized by the second user, for example, to record an audio file, such as a story or other information pertaining to the media object 420. According to some embodiments, such as in the case that the second user does not feel comfortable utilizing the first media enhancement device 410*a* to record audio and/or in the case that the first media enhancement device 410*a* can't record audio and/or in the case that the second user simply desires to speak to an operator, the second user may utilize the second media enhancement device 410*b* to provide and/or indicate one or more supplemental media objects. The second user may dial a telephone number via the second media enhancement device 410*b*, which may connect the second user to an IVRU and/or operator of a service available for facilitating the providing of media object enhancements, for example. In some embodiments, the second user may record audio and/or provide instructions via the second media enhancement device 410*b*, and the desired enhancements may be effectuated by a controller device of the service entity. In some embodiments, the enhancements may be provided and/or incorporated in real-time (e.g., while the second user is on the phone) such that the media object 420 output via the first media enhancement device 410*a* is updated as commands, instructions, or supplemental media objects are provided by the second user. In some embodiments, enhancements may be implemented at a later time.

According to some embodiments, such as in the case that the first media enhancement device 410*a* comprises communication functionality, the second user may utilize the first media enhancement device 410*a* to interface with an IVRU, operator, and/or other remotely-located entity and/or device (e.g., to provide and/or define an enhancement to the media object 420).

VI. Media Enhancement Methods and Processes

Figure 5A:
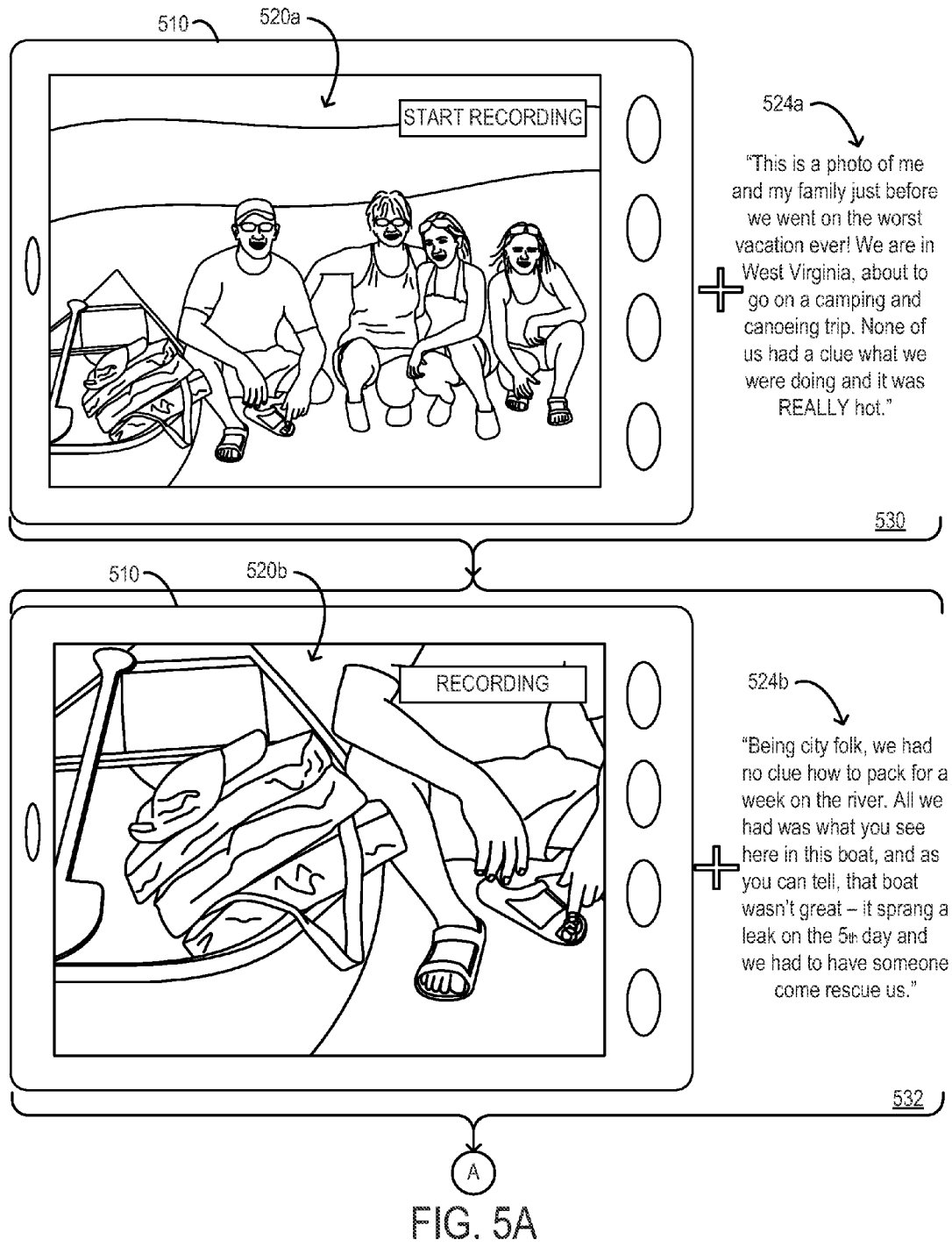
FIG. 5A and FIG. 5B are block diagrams of a process according to some embodiments.
Figure 5B:
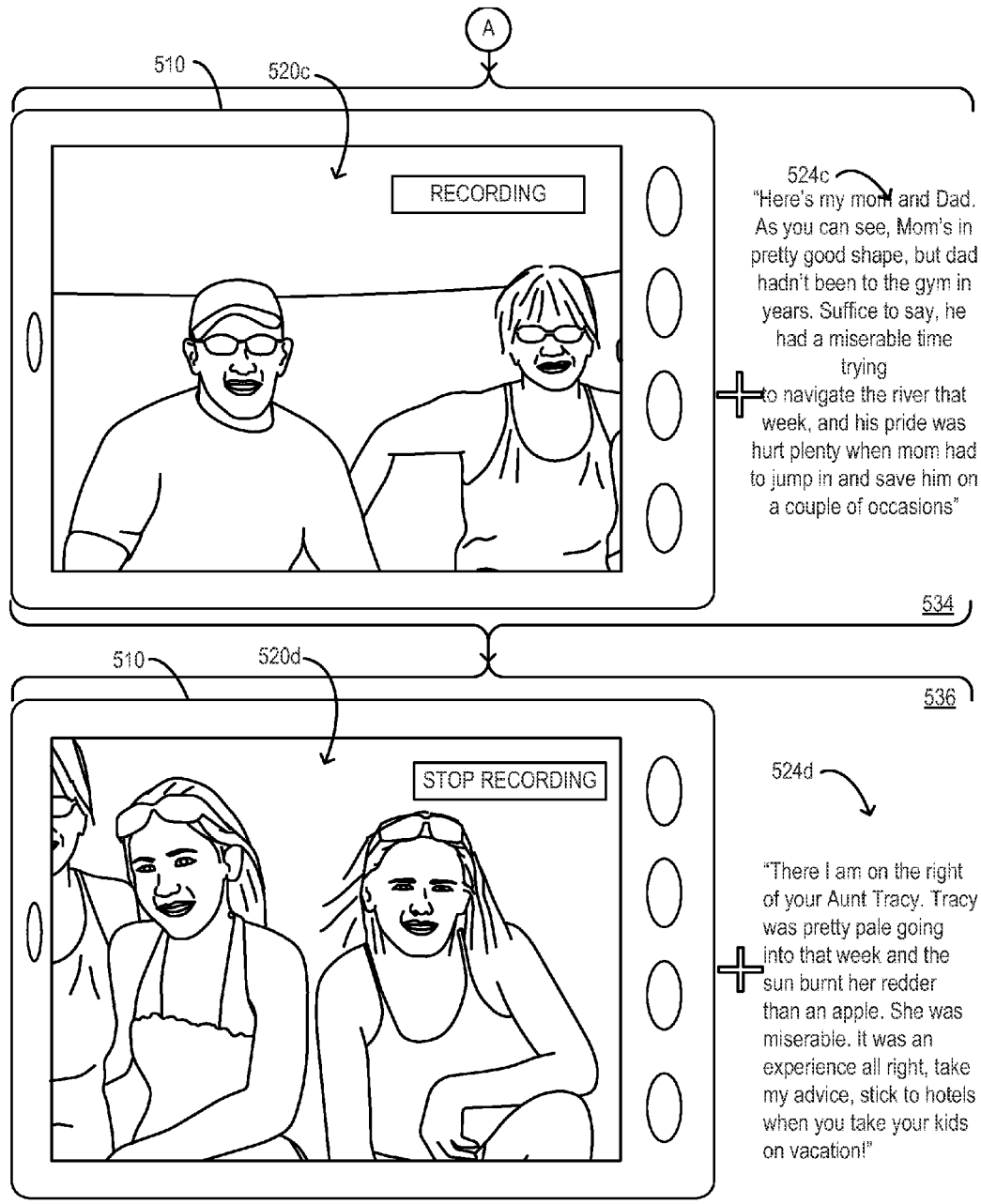

Turning now to FIG. 5A and FIG. 5B, block diagrams of a process 500 according to some embodiments are shown. In some embodiments, the process 500 may be performed and/or implemented by and/or otherwise associated with one or more specialized computerized processing devices (e.g., the first-user devices 102*a-c*, 202 the controller devices 104*a-b*, 204, and/or the second-user devices 110*a-b*, 210, 410*a-b* of FIG. 1, FIG. 2, and/or FIG. 4 herein), specialized computers, computer terminals, computer servers, computer systems and/or networks (e.g., the network 106 of FIG. 1), and/or any combinations thereof. In some embodiments, the process 500 may be embodied in, facilitated by, and/or otherwise associated with various input mechanisms and/or interfaces described herein. According to some embodiments, the process 500 may be similar in functionality to and/or comprise (in whole or in part) the process 200 of FIG. 2 and/or the method 300 of FIG. 3 herein.

According to some embodiments, the process 500 may comprise various procedures performed in association with a media enhancement device 510, a media object 520 (and/or various configurations of the media object 520*a-d*), and/or supplemental media object(s) 524*a-d*. According to some embodiments, fewer or more components 510, 520*a-d*, 524*a-d* and/or various configurations of the depicted components 510, 520*a-d*, 524*a-d* may be included in execution of the process 500 without deviating from the scope of embodiments described herein. In some embodiments, the components 510, 520*a-d*, 524*a-d* may be similar in configuration and/or functionality to similarly named and/or numbered components as described with reference to the system 100 of FIG. 1, the process 200 of FIG. 2, the method 300 of FIG. 3, and/or the system 400 of FIG. 4 herein.

In some embodiments, the process 500 may comprise initiating an enhancement (or a "first enhancement") of the media object 520, at 530. The media enhancement device 510 may be utilized, for example, to indicate that the first supplemental media object 524*a* should be associated with (e.g., stored in relation to) the first configuration of the media object 520*a* (which in this example, is coincident with the media object 520 itself). In some embodiments, a user of the media enhancement device 510 may provide input to the media enhancement device 510 indicating that a sequence of editing and/or enhancement activities should be recorded by the media enhancement device 510 (and/or by one or more devices associated therewith, that are not explicitly shown; e.g., as depicted by the "Start Recording" indication displayed on and/or with the first configuration of the media object 520*a*). The first activity of the sequence at 530 may, for example, comprise providing an audio narration and/or story descriptive of the first orientation of the media object 520*a* (e.g., defining the first supplemental media object 524*a*). As depicted, a description of the photograph (i.e., the media object 520) may be provided text and/or audio (i.e., the first supplemental media object 524*a*). In some embodiments, the first supplemental media object 524*a* may comprise any type, quantity, and/or configuration of media desired and/or may be provided (e.g., by a user of the media enhancement device 510) via the media enhancement device 510 and/or via one or more other means (e.g., by placing a telephone call, text message, writing a letter, etc.). In some embodiments, the first supplemental media object 524*a* may be sent and/or provided to (and subsequently received and/or accessed by) a remote device (not shown) such as a controller device and/or another user's device (e.g., the first-user device 102a-c, 202 of FIG. 1 and/or FIG. 2).

According to some embodiments, the process 500 may comprise indicating a second enhancement to the media object 520 (e.g., defining the second configuration of the media object 520b), at 532. In some embodiments, the second configuration of the media object 520b may comprise an altered, edited, and/or otherwise changed version of the first configuration of the media object 520a (and/or of the "original" media object 520). As depicted in FIG. 5A, for example, the second configuration of the media object 520b may comprise a cropped and/or zoomed-in version of the first configuration of the media object 520a. The user of the media enhancement device 510 may, for example, utilize the media enhancement device 510 to provide input defining the second configuration of the media object 520b—such as a zoom-in to the area of the picture showing the canoe and camping supplies. According to some embodiments, the media enhancement device 510 may record and/or otherwise determine or keep track of any changes made during the transition and/or transformation from the first configuration of the media object 520a to the second configuration of the media object 520b (e.g., as indicated by the "Recording" indication displayed on and/or with the second configuration of the media object 520b). In some embodiments, the second supplemental media object 524b may be stored in association with the second configuration of the media object 520b and/or in relation to any changes (e.g., a sequence of changes and/or executed commands) made to the first configuration of the media object 520a to arrive at the second configuration of the media object 520b. In some embodiments, such as depicted in FIG. 5A, the second supplemental media object 524b may comprise information descriptive of a portion, subset, and/or specific area of the media object 520.

In some embodiments, the process 500 may proceed to "A", which continues in FIG. 5B. From "A", the process 500 may comprise indicating a third enhancement to the media object 520 (e.g., defining the third configuration of the media object 520c), at 534. In some embodiments, the third configuration of the media object 520c may comprise an altered, edited, and/or otherwise changed version of the first configuration of the media object 520a (and/or of the "original" media object 520) and/or of the second configuration of the media object 520b. As depicted in FIG. 5B, for example, the third configuration of the media object 520c may comprise a cropped and/or zoomed-in version of the first configuration of the media object 520a, which may be of a different area or portion of the media object 520 (e.g., a focus on the parents instead of the camping gear). In some embodiments, the third supplemental media object 524c may be provided and stored in association with the third configuration of the media object 520c. The media enhancement device 510 may, for example, store an indication relating the third configuration of the media object 520c to a time during the process 500 and/or to the third configuration of the media object 520c.

According to some embodiments, the process 500 may comprise indicating a fourth enhancement to the media object 520 (e.g., defining the fourth configuration of the media object 520d), at 536. In some embodiments, the fourth configuration of the media object 520d may comprise an altered, edited, and/or otherwise changed version of the first configuration of the media object 520a (and/or of the "original" media object 520), of the second configuration of the media object 520b, and/or of the third configuration of the media object 520c. As depicted in FIG. 5B, for example, the fourth configuration of the media object 520d may comprise a cropped and/or zoomed-in version of the first configuration of the media object 520a, which may be of a different area or portion of the media object 520 (e.g., a focus on the girls instead of the parents). In some embodiments, such as in the case that it is desired to end the enhancement (and/or sequence of enhancements), an indication may be provided to the media enhancement device 510. The "Stop Recording" indication displayed on and/or with the fourth configuration of the media object 520d may indicate that the enhancement recording and/or storing of any supplemental media objects 524a-d is complete.

In some embodiments, once the series of supplemental media objects 524a-d is associated with the various configurations of the media object 520a-d, a new version of the media object 520 and/or a new media object (not shown) may be created. The media enhancement device 510 may, for example, combine the supplemental media objects 524a-d and the media object 520 (and/or various configurations 520a-d thereof) to produce a new media object. In some embodiments, the sequence of changes to the media object 520 may also or alternatively be included in the new media object. In such a manner, for example, a narrated slideshow describing various portions of the photograph may be created. While a digital photograph and supplemental audio enhancement and various crop/zoom edit enhancements are described in reference to the process 500, other types of media objects, supplemental media objects, combinations of media object and supplemental media object types, and/or different commands and/or edits may be utilized in the process 500.

According to some embodiments, while not explicitly depicted in FIG. 5A or FIG. 5B, various transmissions and/or provisions of information (e.g., as described herein) may be included in the process 500. The media enhancement device 510 may prompt a user to provide enhancements to the media object 520 based on one or more media enhancement requests received from a remote device (e.g., the controller device 104a-b, 204 and/or the first-user device 102a-c, 202 of FIG. 1 and/or FIG. 2), for example, and/or the supplemental media objects 524a-d, edit commands, various configurations of the media object 520a-d, the new media object, and/or other information (e.g., a user identifier), may be provided by the media enhancement device 510 to one or more external and/or remote devices (not shown). In some embodiments, the new media object, such as the exemplary narrated slideshow based on the media object 520, may be posted on a Social Networking site and/or transmitted directly to an associated user (e.g., a "friend").

Any transmissions and/or flow of data in association with the process 500 may be accomplished via one or more network connections and/or communication links between the components 510 (and others not shown in FIG. 5A or FIG. 5B). While a network (such as the network 106 of FIG. 1) is not explicitly shown in FIG. 5A or FIG. 5B, for example, it should be understood that the described communications may occur over, through, and/or via such a network and/or may be facilitated by one or more network components thereof.

Figure 6:
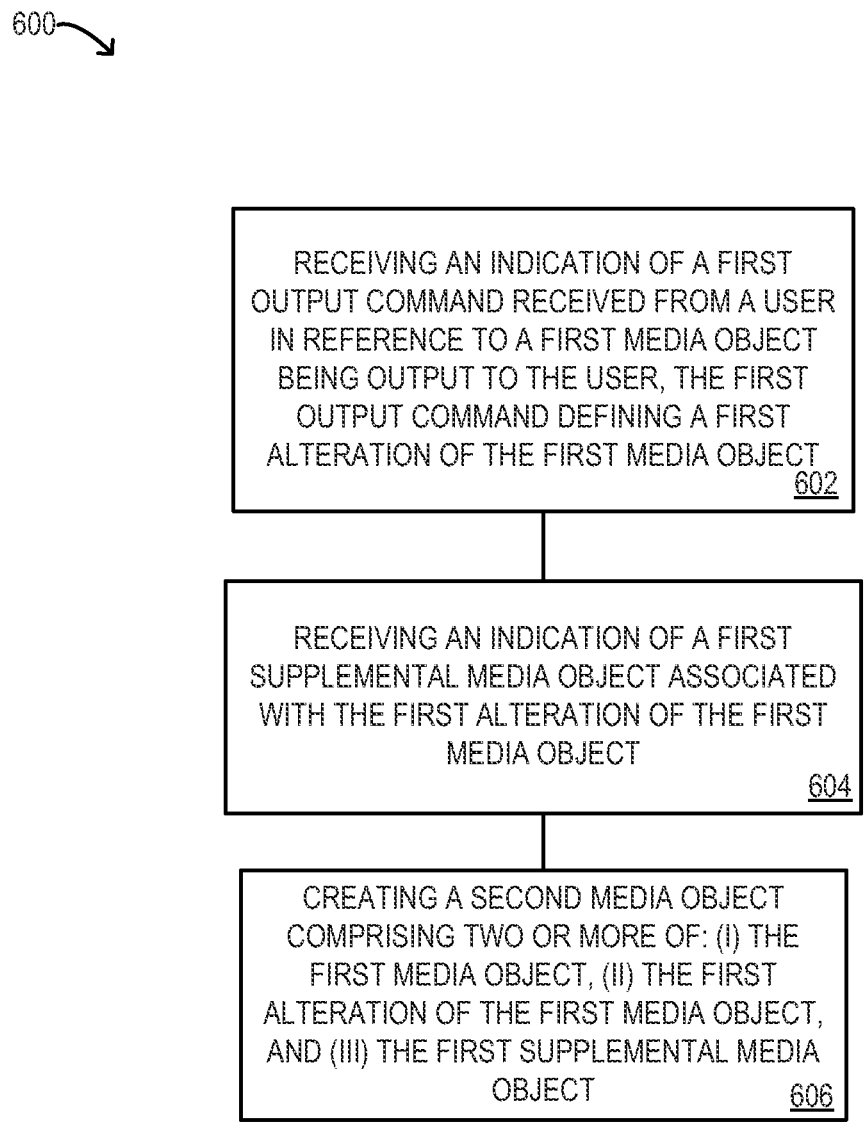
FIG. 6 is a flow diagram of a method according to some embodiments.

Referring now to FIG. 6, a flow diagram of a method 600 according to some embodiments is shown. In some embodiments, the method 600 may be performed and/or implemented by and/or otherwise associated with one or more specialized computerized processing devices (e.g., the first-user devices 102a-c, 202, the controller devices 104a-b, 204, and/or the second-user devices 110a-b, 210, 410, 510 of FIG. 1, FIG. 2, FIG. 4, FIG. 5A, and/or FIG. 5B herein), specialized computers, computer terminals, computer servers, computer systems and/or networks (e.g., the network 106 of FIG. 1), and/or any combinations thereof. In some embodiments, the method 600 may be embodied in, facilitated by, and/or otherwise associated with various input mechanisms and/or interfaces described herein. According to some embodiments, the method 600 may be similar in functionality to and/or comprise (in whole or in part) the processes 200, 500 of FIG. 2, FIG. 5A, and/or FIG. 5, and/or the method 300 of FIG. 3 herein.

In some embodiments, the method 600 may comprise receiving (e.g., by a processing device) an indication of a first output command received from a user in reference to a first media object being output to the user, the first output command defining a first alteration of the first media object, at 602. A device, software program (e.g., an application or "App"), website, and/or other interface may, for example, receive an indication from a user regarding how a media object is desired to be enhanced. According to some embodiments, the device receiving the indication may comprise a processing device (e.g., a CPU) of a digital picture frame, alarm clock, television, and/or other low-tech device (e.g., a device that is not a computer). In some embodiments, the input of the output command may comprise a request to alter how the media object is being output. In the case that the media object comprises an image, picture, and/or photograph, for example, the desired output command may comprise one or more of a zoom-in command, a zoom-out command, a change in viewing orientation command, a change in portion of the first media object displayed command, an image cutout command, or an image crop command. In the case that the media object comprises audio, the desired output command may comprise one or more of a change in volume command, a change in playback speed command, a change in tone or pitch command, or a stop, pause, play, rewind, or fast-forward. In the case that the media object comprises video, the desired output command may comprise one or more of a change in speed or frame rate command, or a stop, pause, play, rewind, or fast-forward command. In some embodiments, the receiving at 602 may be conducted in response to a media enhancement request. A user having taken note of a provided media enhancement request may, for example, utilize a low-tech device such as a digital picture frame to respond to the request (at least in part) by sending or creating the indication received at 602 (e.g., defining the first alteration).

According to some embodiments, the method 600 may comprise receiving (e.g., by the processing device) an indication of a first supplemental media object associated with the first alteration of the first media object, at 604. Any type, quantity, configuration, style, and/or combination of media objects may be received, for example, by a controller device of a service that facilitates media enhancement requests and/or by a low-tech user device such as a digital picture frame. In some embodiments, the first supplemental media object may be recorded and/or stored in time-sequence with a series of edits and/or other commands (such as the first output command and/or the first alteration, from 602). According to some embodiments, the first supplemental media object may be received at a time not coincident with the receiving of the indication of the first output command, but an indication of a relation between the first supplemental media object and the first output command and/or first alteration may nevertheless be stored. The user may execute a plurality of commands to arrive at the first alteration, for example, but only desire the end-state (i.e., the first alteration) to be associated with the first supplemental media object. Whereas in some embodiments, the first supplemental media object may instead be intended to coincide with the plurality of commands. According to some embodiments, the indication of the first supplemental media object may comprise the first media object itself (e.g., an audio recording or file, a video file, an image file, etc.). According to some embodiments, the indication of the first supplemental media object may comprise a link, pointer, or reference to where the first supplemental media object may be accessed and/or obtained. In some embodiments, the receiving at 604 may be conducted in response to a media enhancement request. A user having taken note of a provided media enhancement request may, for example, utilize a low-tech device such as a television or standard telephone to respond to the request (at least in part) by sending or creating the indication received at 604.

In some embodiments, the method 600 may comprise creating (e.g., by the processing device) a second media object comprising two or more of: (i) the first media object, (ii) the first alteration of the first media object, and (iii) the first supplemental media object, at 606. A processing device, software application, and/or web application may be utilized, for example, to create a new media object (i.e., the second media object) comprising the original (i.e., first) media object with the first supplemental media object. According to some embodiments, such as in the case that any edits or changes to the first media object are indicated as intended for inclusion in the new media object, such changes may be reflected as a video or slideshow of changes and/or commands, or may be included as distinct media objects themselves, within the new media object. In some embodiments, multiple devices may facilitate the creation of the new media object. A local user device such as a low-tech user device (or combination of low-tech user devices) may be utilized to indicate desired enhancements, for example, and a central service and/or an operator, employee, and or server device thereof may execute the desired instructions (e.g., "combine the original video file with the indicated audio file").

According to some embodiments, the method 600 may comprise providing (e.g., by the processing device and/or to one or more devices of users having stored associations with the user) the second media object. In the case that the second media object is defined and/or created in response to a media object enhancement request, for example, the second media object may be provided and/or transmitted to the user and/or device from which the request originated (e.g., in response to the request). In some embodiments, a processing device of a local user device (e.g., a low-tech) device may initiate and/or cause the providing. According to some embodiments, such as in the case that the providing comprises posting the second media object on and/or via one or more Social Networking website, the second media object may be "pulled" from the user's low-tech device (e.g., retrieved from a memory thereof by a server and/or other remote device).

VII. Media Enhancement Interfaces

Figure 7:
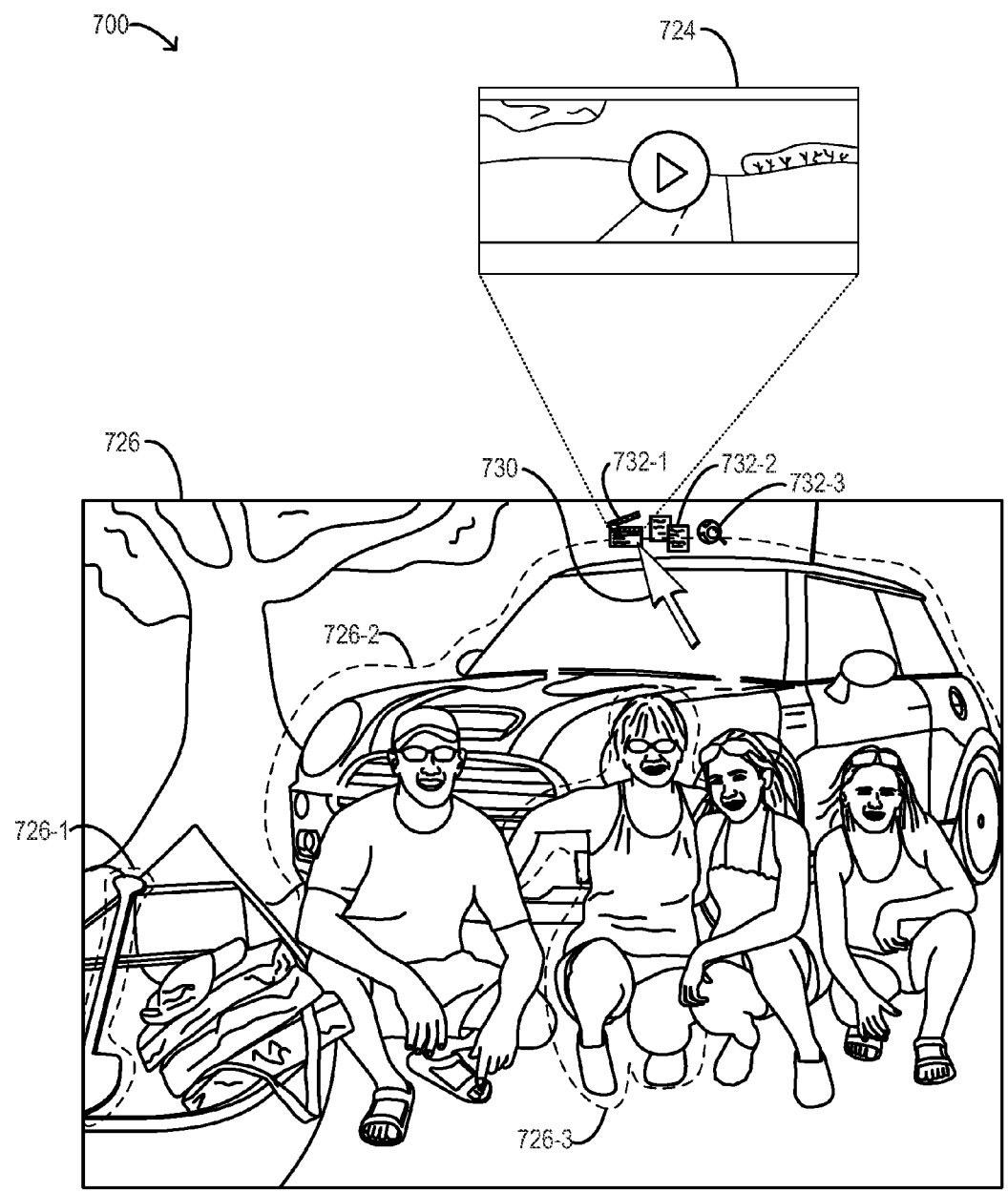
FIG. 7 is a block diagram of an interface according to some embodiments.

Turning now to FIG. 7, a block diagram of an interface 700 according to some embodiments is shown. In some embodiments, the interface 700 may comprise a web page, web form, database entry form, Application Program Interface (API), spreadsheet, table, and/or application or other Graphical User Interface (GUI), such as a smart phone application or the touch-screen of a digital picture frame. The interface 700 may, for example, be utilized by a user to define and/or provide media object enhancements in accordance with embodiments described herein. The interface 700 may, for example, comprise a portion of a media object enhancement application and/or platform programmed and/or otherwise configured to execute, conduct, and/or facilitate any of the various methods 300, 600 of FIG. 3 and/or FIG. 6 and/or the processes 200, 500 of FIG. 2, FIG. 5A, and/or FIG. 5B, and/or portions or combinations thereof. In some embodiments, the interface 700 may be output via one or more computerized and/or electronic device such as the second-user device 110a-b, 210, 410a-b of FIG. 1, FIG. 2, and/or FIG. 4 herein.

According to some embodiments, the interface 700 may comprise a supplemental media object 724 combined with, attached to, and/or embedded in or otherwise associated with an enhanced media object 726. In some embodiments, the enhanced media object 726 may comprise one or more enhanced portions 726-1, 726-2, 726-3. According to some embodiments, the interface 700 may comprise a pointer 730 and/or one or more enhancement icons 732-1, 732-2, 732-3. According to some embodiments, fewer or more components 724, 726, 730, 732 and/or various configurations of the depicted components 724, 726, 730, 732 may be included in the interface 700 without deviating from the scope of embodiments described herein. In some embodiments, the components 724, 726 may be similar in configuration and/or functionality to similarly named and/or numbered components as described with reference to the systems 100, 400 of FIG. 1 and/or FIG. 4, the methods 300, 600 of FIG. 3 and/or FIG. 6, and/or the processes 200, 500 of FIG. 2, FIG. 5A and/or FIG. 5B, herein.

In some embodiments, such as depicted in FIG. 7, the enhanced media object 726 may comprise one or more enhanced portions 726-1, 726-2, 726-3 (indicated by dashed-lines in FIG. 7; although not necessarily visible or human-visible in practice). The enhanced portions 726-1, 726-2, 726-3 may, for example, comprise portions of the enhanced media object 726 to which (or for which) one or more media objects such as the supplemental media object 724 are attached, embedded, linked, and/or otherwise associated. As shown in the example enhanced media object 726 of FIG. 7, for example, the canoe paddle may comprise the first enhanced portion 726-1, the car may comprise the second enhanced portion 726-2, and/or the lady in the middle of the picture may comprise the third enhanced portion 726-3. According to some embodiments, each of the enhanced portions 726-1, 726-2, 726-3 may be enhanced with one or more supplemental media objects (not explicitly shown).

As an example, the second enhanced portion 726-2 (i.e., the car) may be enhanced with the supplemental media object 724, which in the example of FIG. 7, comprises a video (e.g., a video file, clip, and/or other recording). In some embodiments, the supplemental media object 724 may be attached to and/or associated with the enhanced media object 726 in a manner such that upon acquiring focus form a user, such as by a click and/or mouse-over utilizing the pointer 730, the supplemental media object 724 is provided and/or output. In some embodiments, such as in the example of FIG. 7, one or more enhancement icons 732-1, 732-2, 732-3 may be output upon the second enhanced portion 726-2 receiving focus. The first enhancement icon 732-1 may comprise an indication of supplemental video (e.g., the supplemental media object 724), for example, the second enhancement icon 732-1 may comprise an indication of supplemental documents, text, messages, comments, and/or data (e.g., picture attributes such as date taken, camera settings, screen name of the posting user, identifying information of the user having provided the particular enhancement, etc.), and/or the third enhancement icon 732-3 may comprise an indication of supplemental location information such as where the picture was taken and/or where the car in the picture is located (e.g., currently).

In some embodiments, the enhancement icons 732-1, 732-2, 732-3 may be presented to a user upon activation of the respective one or more of the enhanced portions 726-1, 726-2, 726-3. According to some embodiments, the different enhanced portions 726-1, 726-2, 726-3 may be pre-defined (e.g., prior to enhancement) by a service and/or by a user providing the original media object from which the enhanced media object 726 is created. In some embodiments, the different enhanced portions 726-1, 726-2, 726-3 may be defined by users conducting and/or causing the related enhancement. A user posting an original of the photo shown in FIG. 7 online (such as on a Social Networking site or online storage site) may, for example, pre-define certain portions of the photo for which enhancement is desired (e.g., a media object enhancement request) or may simply post the photo and allow other users to define which portion or subset (if any) of the original should be associated with supplemental media objects.

In such a manner, for example, a first user may post a media object online (and/or send the media object to one or more other users and/or respective devices) so that supplemental media objects may be associated therewith. In some embodiments, the first user may send or post a media enhancement request alone with the original media object such as: "what kind of car is in this photo?", "what bird makes this sound?" (e.g., for an audio type media object), "can anyone make out from this video where it was taken?" or "what year?". In such a manner, media objects may be enhanced via collaboration between various and/or disparate users that may have (or have access to) the desired knowledge. According to some embodiments as described herein, the media enhancement request may be sent or directed to specific individuals or users, groups, teams, etc. A media request that may have originated the enhancement of the enhanced media object 726, for example, might have read: "what type of gas mileage does this kind of car get?" or "does anyone know what ever happened to our old car?".

In response, various users such as car enthusiasts or family members (e.g., groups that the media request may be sent, provided, and/or targeted to) may reply by attaching, embedding, appending, tagging, and/or otherwise associating various supplemental media objects such as the supplemental media object 724 (e.g., a video of a portion of a road trip or test drive in the pictured car). In some embodiments, the media enhancement request may be limited to specific groups of user such as a group of Facebook® friends or one or more Facebook® of LinkedIn® Groups. According to some embodiments, the media enhancement request may be open to anyone having access to the original media and request—e.g., the request may be public, such as a blog posting.

While various components of the interface 700 have been described with respect to certain labels, layouts, headings, titles, icons, tags, and/or configurations, these features have been presented for reference and example only. Other labels, layouts, headings, titles, tags, icons, and/or configurations may be implemented without deviating from the scope of embodiments herein. Similarly, while a certain number of tabs, information screens, form fields, and/or data entry options have been presented, variations thereof may be practiced in accordance with some embodiments.

VIII. Media Enhancement Collaboration Method

Figure 8:
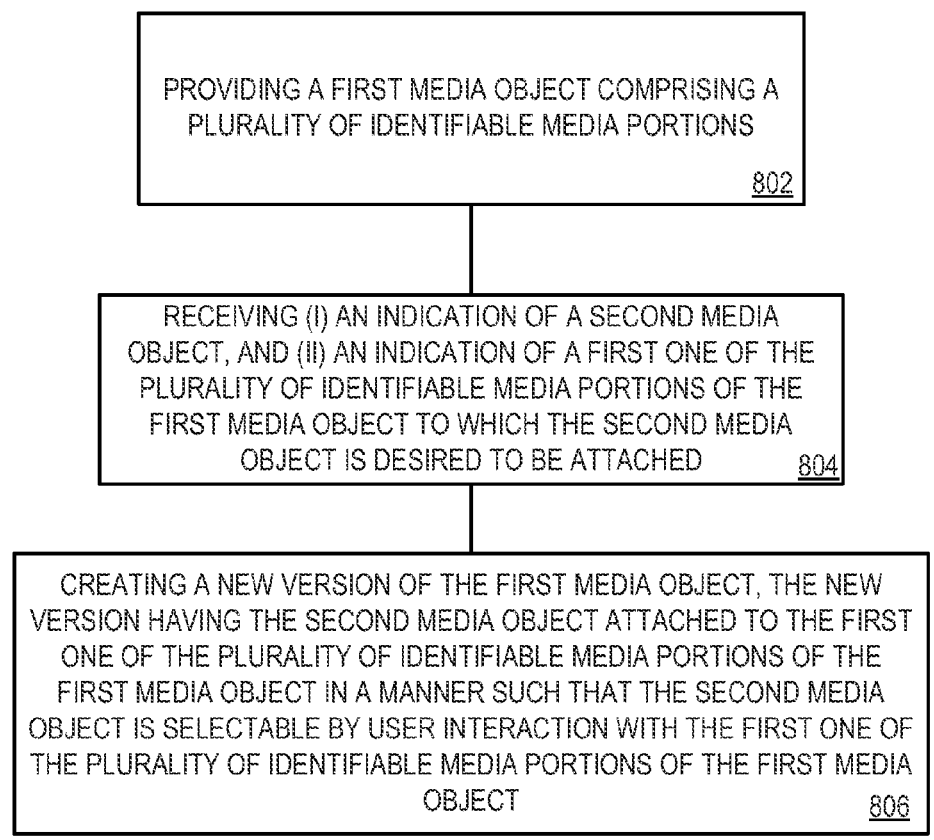
FIG. 8 is a flow diagram of a method according to some embodiments.

Turning to FIG. 8, a flow diagram of a method 800 according to some embodiments is shown. In some embodiments, the method 800 may be performed and/or implemented by and/or otherwise associated with one or more specialized computerized processing devices (e.g., the first-user devices 102a-c, 202, the controller devices 104a-b, 204, and/or the second-user devices 110a-b, 210, 410, 510 of FIG. 1, FIG. 2, FIG. 4, FIG. 5A, and/or FIG. 5B herein), specialized computers, computer terminals, computer servers, computer systems and/or networks (e.g., the network 106 of FIG. 1), and/or any combinations thereof. In some embodiments, the method 800 may be embodied in, facilitated by, and/or otherwise associated with various input mechanisms and/or interfaces (e.g., the interface 700 of FIG. 7) described herein. According to some embodiments, the method 800 may be similar in functionality to and/or comprise (in whole or in part) the processes 200, 500 of FIG. 2, FIG. 5A, and/or FIG. 5B, and/or the methods 300, 600 of FIG. 3 and/or FIG. 6 herein.

In some embodiments, the method 800 may comprise providing (e.g., by an electronic controller and/or via a social networking interface) a first media object comprising a plurality of identifiable media portions, at 802. A picture, video, audio file, and/or other media object type and/or combination of media objects may, for example, be tagged with one or more portions for which enhancements may be provided. In some embodiments, the identifiable portions may be pre-defined and/or configured (e.g., configured or coded to respond to user focus and/or input). According to some embodiments, the identifiable portions may be identified, tagged, and/or configured after the providing of the first media object. In some embodiments, such as in the case that a user desires to have the first media object enhanced by a user of a digital picture frame or other specific device, the providing may comprise transmitting the first media object to such a device. In some embodiments, the providing may comprise posting the first media device on a website such as a Social Networking website or online storage website, such that users other than the posting user may have access to the first media object (e.g., to perform enhancements on the first media object). In some embodiments, the website and/or other access point may conduct the providing (e.g., by allowing access and/or by managing user credentials, accounts, etc.).

According to some embodiments, the method 800 may comprise receiving (e.g., by the electronic controller and via the social networking interface) (i) an indication of a second media object, and (ii) an indication of a first one of the plurality of identifiable media portions of the first media object to which the second media object is desired to be attached, at 804. In the case that the first one of the plurality of identifiable media portions is pre-defined (e.g., prior to posting or providing at 802), for example, a user may select the first one of the plurality of identifiable media portions and provide an indication of a second media object that the user desires to be associated with the first one of the plurality of identifiable media portions. In some embodiments, the second media object may be dragged-and-dropped by the user (e.g., via a computer interface such as a GUI) onto the first one of the plurality of identifiable media portions. In some embodiments, such as in the case that the first one of the plurality of identifiable media portions is not pre-defined, an indication defining the first one of the plurality of identifiable media portions may also be received. In some embodiments, any indications received at 804 may be received by any or all of the various devices described herein, such as the controller device 104a-b, 204 and/or the second-user device 110a-b, 210, 410 of FIG. 1, FIG. 2, and/or FIG. 4 herein.

In some embodiments, the method 800 may comprise creating (e.g., by the electronic controller) a new version of the first media object, the new version having the second media object attached to the first one of the plurality of identifiable media portions of the first media object in a manner such that the second media object is selectable (e.g., via the social networking interface) by user interaction with the first one of the plurality of identifiable media portions of the first media object. The new version of the media object may, for example, be interactive. A user mousing-over different portions of the new media object, such as the first one of the plurality of identifiable media portions, for example, may be presented with the second media object. In some embodiments, the presentation and/or outputting of the second media object may be conducted automatically upon an occurrence of a triggering event (e.g., a mouse-over, click, and/or menu-driven event). In some embodiments, the second media object may be indicated, such as by display of an icon or thumbnail image, and the accessing user may interface with (e.g., click on) the displayed icon or thumbnail to access the attached, embedded, and/or integral second media object.

For example, making the new version of the media object interactive (and/or making the first media object interactive by creating the new version of the media object) may comprise associating (e.g., by the electronic controller) an icon with the first one of the plurality of identifiable media portions of the first media object, causing (e.g., by the electronic controller) the icon to be displayed upon the first one of the plurality of identifiable media portions of the first media object obtaining focus from a user interaction (e.g., via the social networking interface), and/or causing (e.g., by the electronic controller), upon a selection of the displayed icon, the second media object to be output.

According to some embodiments, the new version of the media object may comprise the second media object along with the first media object (and/or one or more edited versions thereof) such that a transmittal of the new version of the media object comprises a stand-alone media object that does not require access to external data sources. Instead of embedding a link to a location of the second media object within the first media object, for example, the actual second media object (e.g., a copy thereof) may be included within the new version of the media file.

According to some embodiments, the method 800 may comprise providing (e.g., by the electronic controller and/or via the social networking interface) the new version of the first media object. The new version of the media object may be transmitted to one or more recipients, for example, and/or may be posted to a website via which different users may have access thereto.

In some embodiments, the method 800 may also or alternatively comprise receiving (e.g., by the electronic controller and/or via the social networking interface) (i) an indication of a third media object, and (ii) an indication of a second one of the plurality of identifiable media portions of the first media object to which the third media object is desired to be attached. In such an embodiments, the new version of the first media object may be created to also have the third media object attached to the second one of the plurality of identifiable media portions of the first media object in a manner such that the third media object is selectable, via the social networking interface, by user interaction with the second one of the plurality of identifiable media portions of the first media object. In some embodiments, the indication of the second media object may be received from a first user and the indication of the third media object may be received from a second user that is different than the first user. In such a manner, for example, various users may collaborate by providing enhancements to the same media object.

IX. Apparatus

Figure 9:
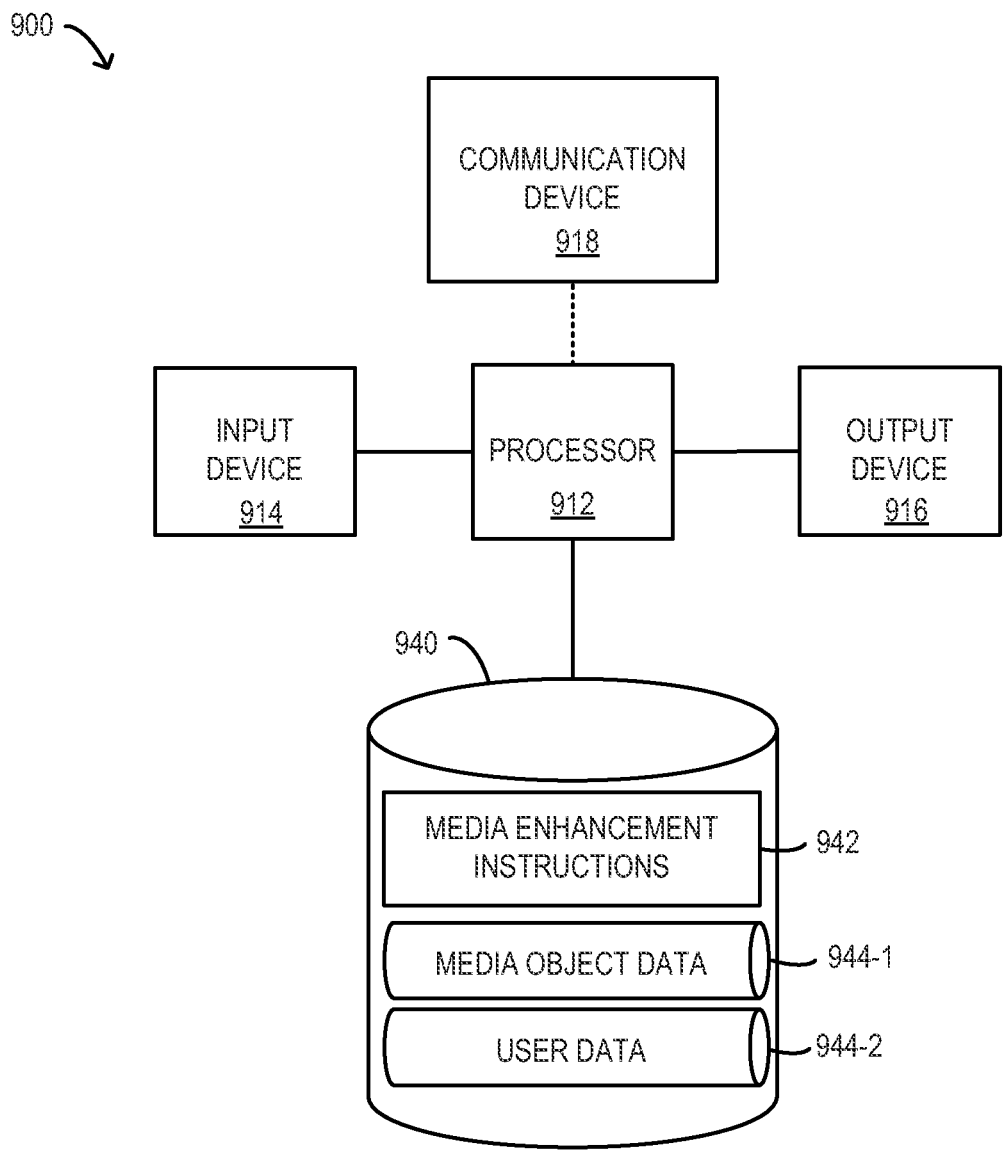
FIG. 9 is a block diagram of an apparatus according to some embodiments.

Turning to FIG. 9, a block diagram of an apparatus 900 according to some embodiments is shown. In some embodiments, the apparatus 900 may be similar in configuration and/or functionality to the first-user devices 102a-c, 202, the second-user devices 110a-c, 210, 410, and/or the controller devices 104a-b, 204 of FIG. 1, FIG. 2, and/or FIG. 4 herein. The apparatus 900 may, for example, execute, process, facilitate, and/or otherwise be associated with the methods 300, 600, 800 of FIG. 3, FIG. 6, and/or FIG. 8 and/or with the processes 200, 500 of FIG. 2, FIG. 5A, and/or FIG. 5B herein.

In some embodiments, the apparatus 900 may comprise a processor 912, an input device 914, an output device 916, a communication device 918, and/or a memory device 940. Fewer or more components 912, 914, 916, 918, 940 and/or various configurations of the components 912, 914, 916, 918, 940 may be included in the apparatus 900 without deviating from the scope of embodiments described herein.

According to some embodiments, the processor 912 may be or include any type, quantity, and/or configuration of electronic and/or computerized processor that is or becomes known. The processor 912 may comprise, for example, an Intel® IXP 2800 network processor or an Intel® XEON™ Processor coupled with an Intel® E7501 chipset, available from Intel® Corporation of Santa Clara, Calif. In some embodiments, the processor 912 may comprise an electronic processor such as an Intel® Core™ 2 Duo P8600 CPU also available from Intel® Corporation of Santa Clara, Calif. In some embodiments, the processor 912 may execute instructions, such as instructions specially programmed into and/or for the processor 912. The execution of the specially-programmed instructions may, for example, enable and/or facilitate the apparatus 900 to operate in accordance with embodiments as described herein.

In some embodiments, the processor 912 may comprise multiple inter-connected processors, microprocessors, and/or micro-engines. According to some embodiments, the processor 912 (and/or the apparatus 900 and/or other components thereof) may be supplied power via a power supply (not shown) such as a battery, an AC source, a DC source, an AC/DC adapter, solar cells, and/or an inertial generator. In the case that the apparatus 900 comprises a server such as a blade server, necessary power may be supplied via a standard AC outlet, power strip, surge protector, and/or UPS device.

In some embodiments, the input device 914 and/or the output device 916 are communicatively coupled to the processor 912 (e.g., via wired and/or wireless connections, traces, and/or pathways) and they may generally comprise any types or configurations of input and output components and/or devices that are or become known, respectively. The input device 914 may comprise, for example, a keyboard that allows an operator of the apparatus 900 to interface with the apparatus 900 (e.g., by an operator of a mobile computing device, such as to implement and/or interact with embodiments herein to provide media object enhancements). The output device 916 may, according to some embodiments, comprise a display screen and/or other practicable output component and/or device. The output device 916 may, for example, provide information, data, and/or images (e.g., media objects) associated with media object enhancement requests and/or media object enhancements. According to some embodiments, the input device 914 and/or the output device 916 may comprise and/or be embodied in a single device such as a touch-screen monitor.

In some embodiments, the communication device 918 may comprise any type or configuration of communication device that is or becomes known or practicable. The communication device 918 may, for example, comprise a NIC, a telephonic device, a cellular network device, a router, a hub, a modem, and/or a communications port or cable. In some embodiments, the communication device 918 may be coupled to provide data to a central controller and/or to mobile customer devices, such as in the case that the apparatus 900 is utilized to enhance one or more media objects as described herein. According to some embodiments, the communication device 918 may also or alternatively be coupled to the processor 912. In some embodiments, the communication device 918 may comprise an IR, RF, Bluetooth™, and/or Wi-Fi® network device coupled to facilitate communications between the processor 912 (and/or the apparatus 900) and another device (such as first-user devices 102a-c, 202, the second-user devices 110a-c, 210, 410, and/or the controller devices 104a-b, 204 of FIG. 1, FIG. 2, and/or FIG. 4 herein).

The memory device 940 may comprise any appropriate information storage device that is or becomes known or available, including, but not limited to, units and/or combinations of magnetic storage devices (e.g., a hard disk drive), optical storage devices, and/or semiconductor memory devices such as RAM devices, ROM devices, SDR-RAM, Double DDR-RAM, and/or PROM. The memory device 940 may, according to some embodiments, store media enhancement instructions 942. In some embodiments, the media enhancement instructions 942 may be utilized by the processor 912 to provide output information via the output device 916 and/or the communication device 918 (e.g., transmitting of the media object and/or the request for media object enhancement at 306 of the method 300 of FIG. 3, and/or the providing of the first media object at 802 of the method 800 of FIG. 8).

According to some embodiments, the media enhancement instructions 942 may be operable to cause the processor 912 to access and/or process media object data 944-1 and/or user data 944-2. Media object data 944-1 and/or user data 944-2 received via the input device 914 and/or the communication device 918 may, for example, be analyzed, sorted, filtered, decoded, decompressed, ranked, scored, plotted, and/or otherwise processed by the processor 912 in accordance with the media enhancement instructions 942. In some embodiments, media object data 944-1 and/or user data 944-2 may be utilized by the processor 912 to facilitate and/or conduct processes and/or methods in accordance with the media enhancement instructions 942 to facilitate and/or effectuate media object enhancements and/or distribution or collaboration as described herein. The media enhancement instructions 942 may, in some embodiments, interface with an application stored on and/or executed by a customer's mobile phone or digital picture frame or TV, for example, to facilitate media object dissemination, enhancement, collaboration, etc.

In some embodiments, the media object data 944-1 may comprise information descriptive of media captured and/or recorder by and/or selected by one or more users. The media object data 944-1 may, for example, comprise information descriptive of and/or defining one or more pictures, sounds, video segments, graphics, logos, and/or other media that a user provides and/or indicates via the apparatus 900. According to some embodiments, the media object data 944-1 may be input and/or recorded by the input device 914 (e.g., a still and/or video camera). In some embodiments, as described herein, the media object data 944-1 may be utilized as the basis for and/or to initiate a media object enhancement request and/or collaboration.

In some embodiments, the user data 944-2 may comprise any data descriptive of and/or that indicates an attribute or characteristic of a user. The user data 944-2 may be acquired during a registration processes (e.g., from the user), for example, and may comprise identifying information such as address, name, e-mail address, preferences, payment accounts and/or information, passwords, etc. In some embodiments, the user data 944-2 may comprise data descriptive of the user that is acquired via transactions conducted with the user/customer. User data 944-2 may comprise, for example, user preferences (empirical), sales history, user "worth" (e.g., expected value) or rating, frequency of purchases, data regarding previous media enhancement requests and/or activities, and/or data indicative of a user's friends, family, teams, and/or other interest groups. In some embodiments, user data 944-2 may comprise information descriptive of social networking sites, accounts, profiles, activity, and/or preferences associated with the user.

While the apparatus 900 is described with reference to specific quantities and types of components 912, 914, 916, 918, 940, variations in the quantities, types, and/or configurations of the components 912, 914, 916, 918, 940 of the apparatus 900 may be implemented without deviating from the scope of the embodiments described herein.

Any or all of the exemplary instructions and data types described herein and other practicable types of data may be stored in any number, type, and/or configuration of memory device 940 that is or becomes known. The memory device 940 may, for example, comprise one or more data tables or files, databases, table spaces, registers, and/or other storage structures. In some embodiments, multiple databases and/or storage structures (and/or multiple memory devices 940) may be utilized to store information associated with the apparatus 900. According to some embodiments, the memory device 940 may be incorporated into and/or otherwise coupled to the apparatus 900 (e.g., as shown) or may simply be accessible to the apparatus 900 (e.g., externally located and/or situated).

X. Articles of Manufacture

Figure 10A:
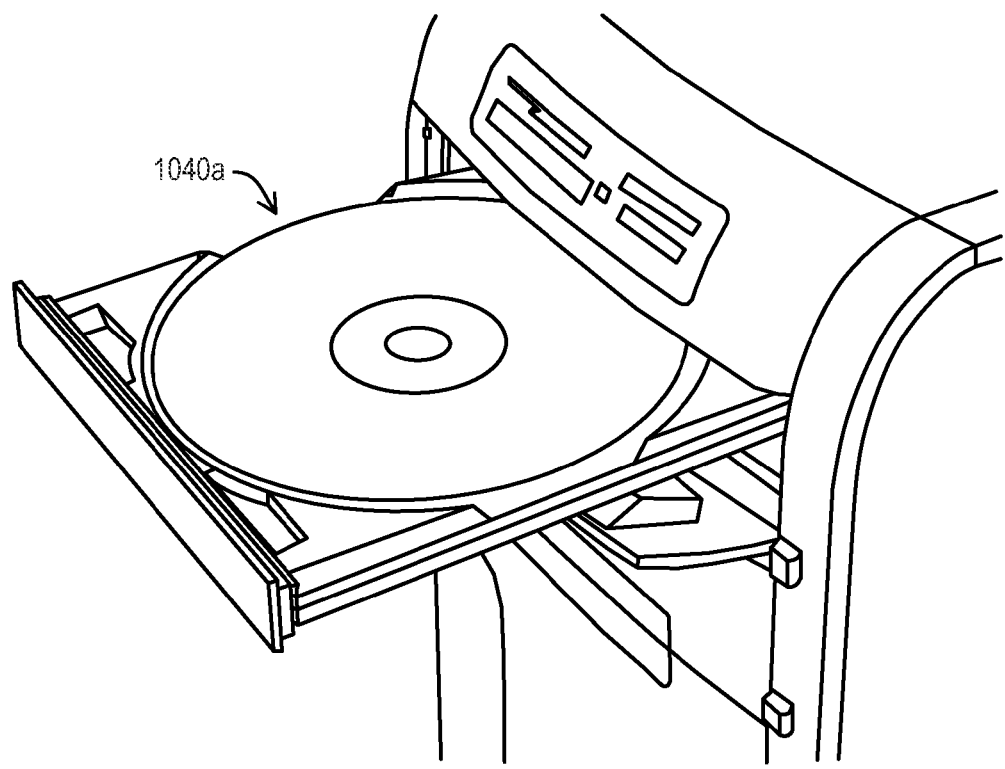
FIG. 10A and FIG. 10B are perspective diagrams of exemplary data storage devices according to some embodiments.
Figure 10B:
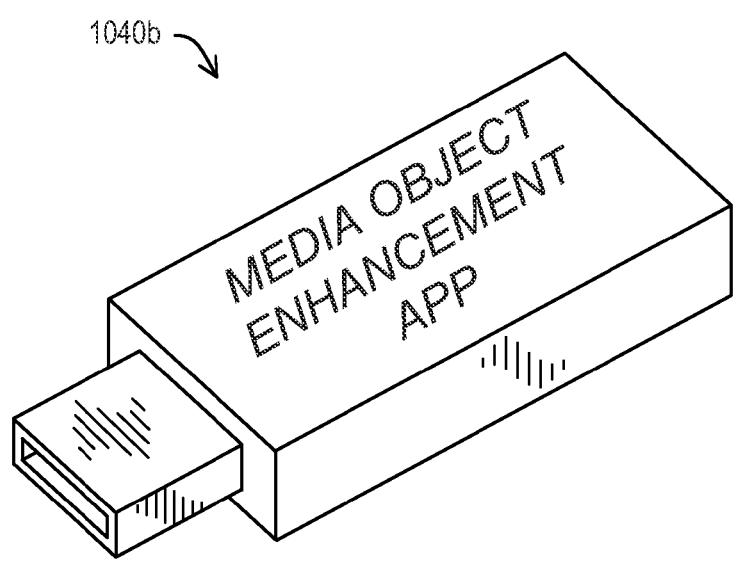

Referring to FIG. 10A and FIG. 10B, perspective diagrams of exemplary data storage devices 1040*a-b* according to some embodiments are shown. The data storage devices 1040*a-b* may, for example, be utilized to store instructions and/or data such as the media enhancement instructions 942, the media object data 944-1, and/or user data 944-2 as described in reference to FIG. 9 herein. In some embodiments, instructions stored on the data storage devices 1040*a-b* may, when executed by a processor (such as the electronic processor), cause the implementation of and/or facilitate any of the various the methods 300, 600, 800 of FIG. 3, FIG. 6, and/or FIG. 8 and/or with the processes 200, 500 of FIG. 2, FIG. 5A, and/or FIG. 5B, as described herein.

According to some embodiments, the first data storage device 1040*a* may comprise a CD, CD-ROM, DVD, Blu-Ray™ Disc, and/or other type of optically-encoded disk and/or other computer-readable storage medium that is or becomes know or practicable. In some embodiments, the second data storage device 1040*b* may comprise a USB keyfob, dongle, and/or other type of flash memory data storage device that is or becomes know or practicable. The data storage devices 1040*a-b* may generally store program instructions, code, and/or modules that, when executed by an electronic and/or computerized processing device cause a particular machine to function in accordance with embodiments described herein. In some embodiments, the data storage devices 1040*a-b* depicted in FIG. 10A and FIG. 10B are representative of a class and/or subset of computer-readable media that are defined herein as "computer-readable memory" (e.g., memory devices as opposed to transmission devices). While computer-readable media may include transitory media types, as utilized herein, the term computer-readable memory is limited to non-transitory computer-readable media. In some embodiments, the data storage devices 1040*a-b* depicted in FIG. 10A and FIG. 10B are representative of programs, instructions and/or data stored on one or more other types of computer-readable memory devices such as internal or external hard drives and/or flash memory.

XI. Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including the specification, its claims and figures, and anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget", so as to encompass embodiments in which (1) the "first widget" is or is the same as the "second widget" and (2) the "first widget" is different than or is not identical to the "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method, comprising:
providing, by an electronic controller and via a social networking interface, a first media object comprising a plurality of identifiable media portions;
receiving, by the electronic controller and via the social networking interface, (i) an indication of a second media object, and (ii) an indication of a first one of the plurality of identifiable media portions of the first media object to which the second media object is desired to be attached;
creating, by the electronic controller, a new version of the first media object, the new version having the second media object attached to the first one of the plurality of identifiable media portions of the first media object in a manner such that the second media object is selectable, via the social networking interface, by user interaction with the first one of the plurality of identifiable media portions of the first media object;
receiving, by the electronic controller and via the social networking interface, (i) an indication of a third media object, and (ii) an indication of a second one of the plurality of identifiable media portions of the first media object to which the third media object is desired to be attached, wherein the new version of the first media object is created to also have the third media object attached to the second one of the plurality of identifiable media portions of the first media object in a manner such that the third media object is selectable, via the social networking interface, by user interaction with the second one of the plurality of identifiable media portions of the first media object, and wherein the indication of the second media object is received from a first user and the indication of the third media object is received from a second user that is different than the first user; and
providing, by the electronic controller and via the social networking interface, the new version of the first media object;
wherein the attachment of the second media object to the first one of the plurality of identifiable media portions of the first media object in a manner such that the second media object is selectable, via the social networking interface, by user interaction with the first one of the plurality of identifiable media portions of the first media, comprises:
associating, by the electronic controller, an icon with the first one of the plurality of identifiable media portions of the first media object;
causing, by the electronic controller, the icon to be displayed upon the first one of the plurality of identifiable media portions of the first media object obtaining focus from a user interaction via the social networking interface; and
causing, by the electronic controller and upon a selection of the displayed icon, the second media object to be output.

2. A method, comprising:
providing, by an electronic controller and via a social networking interface of a mobile electronic device, a first media object comprising a plurality of identifiable media portions;
receiving, by the electronic controller and via the social networking interface of the mobile electronic device, (i) an indication of a second media object, and (ii) an indication of a first one of the plurality of identifiable media portions of the first media object to which the second media object is desired to be embedded;
creating, by the electronic controller, a new version of the first media object, the new version having the second media object embedded in the first one of the plurality of identifiable media portions of the first media object in a manner such that a user selection, via the social networking interface of the mobile electronic device, of any part of the first one of the plurality of identifiable media portions of the first media object causes the second media object to be revealed to the user; and
providing, by the electronic controller and via the social networking interface of the mobile electronic device, the new version of the first media object;
wherein an attachment of the second media object to the first one of the plurality of identifiable media portions of the first media object in a manner such that the second media object is selectable, via the social networking interface, by user interaction with the first one of the plurality of identifiable media portions of the first media, comprises:
associating, by the electronic controller, an icon with the first one of the plurality of identifiable media portions of the first media object;
causing, by the electronic controller, the icon to be displayed upon the first one of the plurality of identifiable media portions of the first media object obtaining focus from a user interaction via the social networking interface; and
causing, by the electronic controller and upon a selection of the displayed icon, the second media object to be output.

* * * * *